US007865595B2

(12) United States Patent
Tatsubori et al.

(10) Patent No.: US 7,865,595 B2
(45) Date of Patent: Jan. 4, 2011

(54) PROCESSING CALL REQUESTS WITH RESPECT TO OBJECTS

(75) Inventors: Michiaki Tatsubori, Kanagawa (JP); Toshiroh Takase, Kanagawa (JP); Yuhichi Nakamura, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 10/538,289

(22) PCT Filed: Dec. 16, 2003

(86) PCT No.: PCT/JP03/16130

§ 371 (c)(1),
(2), (4) Date: Jun. 10, 2005

(87) PCT Pub. No.: WO2004/055685

PCT Pub. Date: Jul. 1, 2004

(65) Prior Publication Data

US 2006/0059252 A1 Mar. 16, 2006

(30) Foreign Application Priority Data

Dec. 18, 2002 (JP) ............................ 2002-366489

(51) Int. Cl.
*G06F 15/173* (2006.01)

(52) U.S. Cl. ............................ 709/225; 711/100; 726/2

(58) Field of Classification Search ................. 709/206, 709/223, 205, 203, 225; 713/202; 711/163; 719/315

See application file for complete search history.

(56) References Cited

U.S. PATENT DOCUMENTS

| | | | | |
|---|---|---|---|---|
| 5,263,165 | A * | 11/1993 | Janis | 711/163 |
| 5,349,663 | A * | 9/1994 | Bailey | 707/100 |
| 5,941,947 | A * | 8/1999 | Brown et al. | 709/225 |
| 6,029,206 | A * | 2/2000 | Endicott et al. | 719/315 |
| 6,243,719 | B1 * | 6/2001 | Ikuta et al. | 707/999.202 |
| 6,629,135 | B1 * | 9/2003 | Ross et al. | 709/218 |
| 6,785,728 | B1 * | 8/2004 | Schneider et al. | 709/229 |
| 2001/0016872 | A1 * | 8/2001 | Kusuda | 709/205 |
| 2002/0120685 | A1 * | 8/2002 | Srivastava et al. | 709/203 |
| 2004/0019809 | A1 * | 1/2004 | Sheinis et al. | 713/202 |

OTHER PUBLICATIONS

PCT/JP03/16130, International Search Report, Feb. 3, 2004, 3 pages.*

PCT/JP03/16130, International Preliminary Report on Patentability, Aug. 30, 2004, 3 pages.*

JP11175745, Jul. 2, 1999, with English translation (Abstract), 15 pages.*

* cited by examiner

*Primary Examiner*—Dustin Nguyen
(74) *Attorney, Agent, or Firm*—David Victor; Konrad Raynes & Victor LLP

(57) ABSTRACT

Provided are a method, system, and program for processing call requests with respect to objects. A call request is received with respect to an object. Access authority for the object is require. An access authority set is read for execution of the call request with respect to the object. A determination is made as to whether the access authority is contained in the access authority set. A storage section storing execution results for a previous execution of the object is searched prior to executing the call request and in response to determining that the access authority is contained in the access authority set.

23 Claims, 23 Drawing Sheets

[Figure 1]
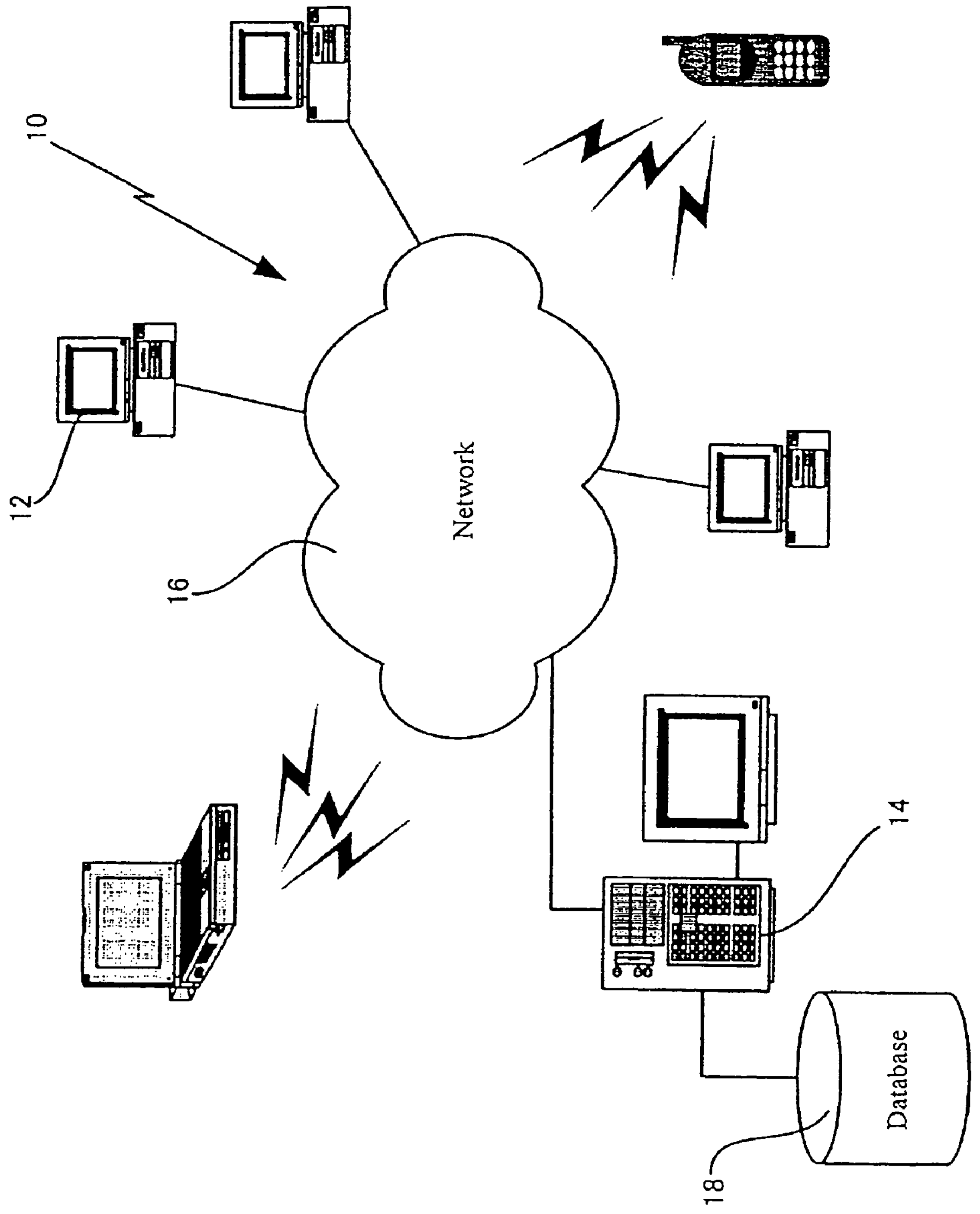

[Figure 2]
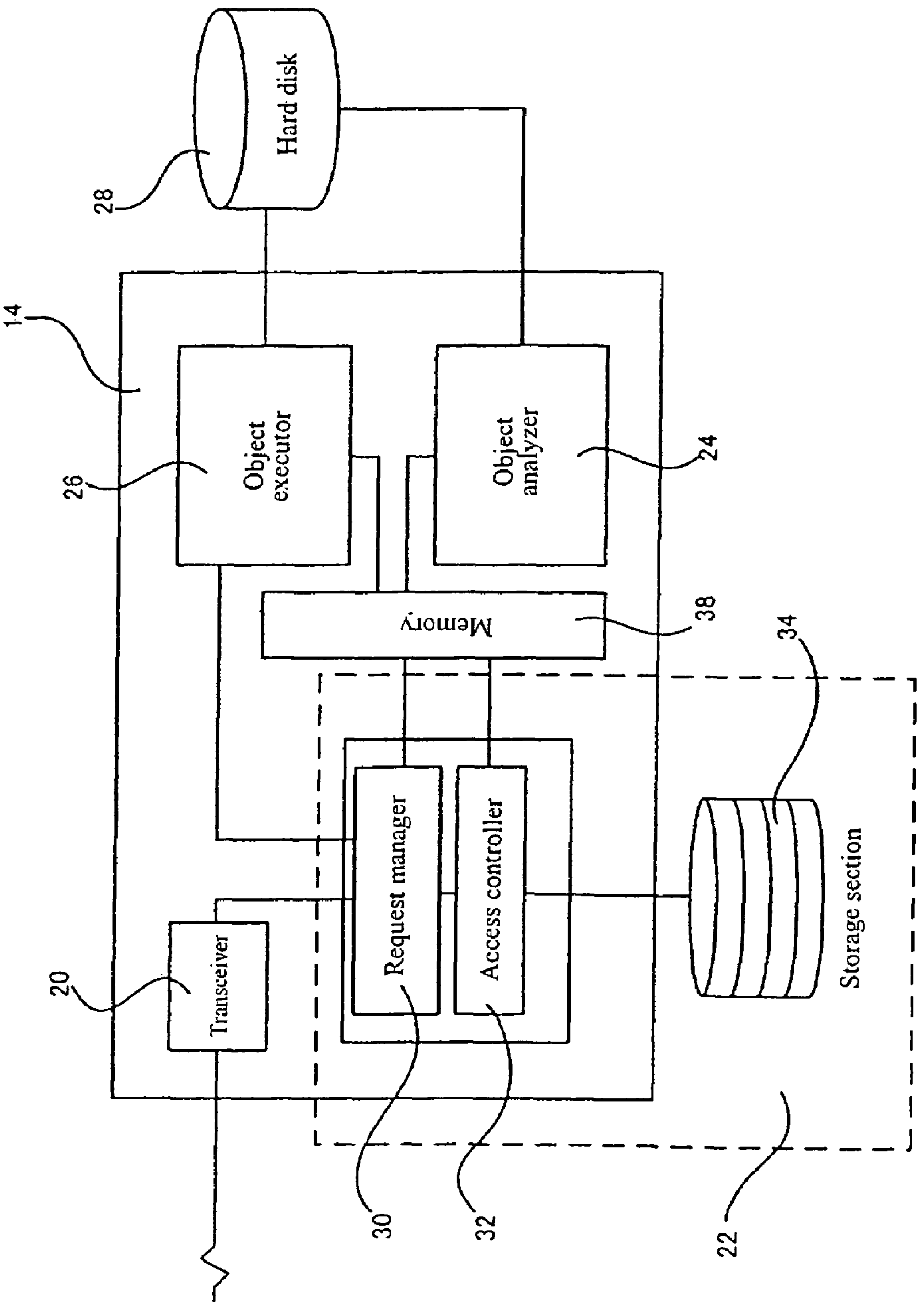

[Figure 3]
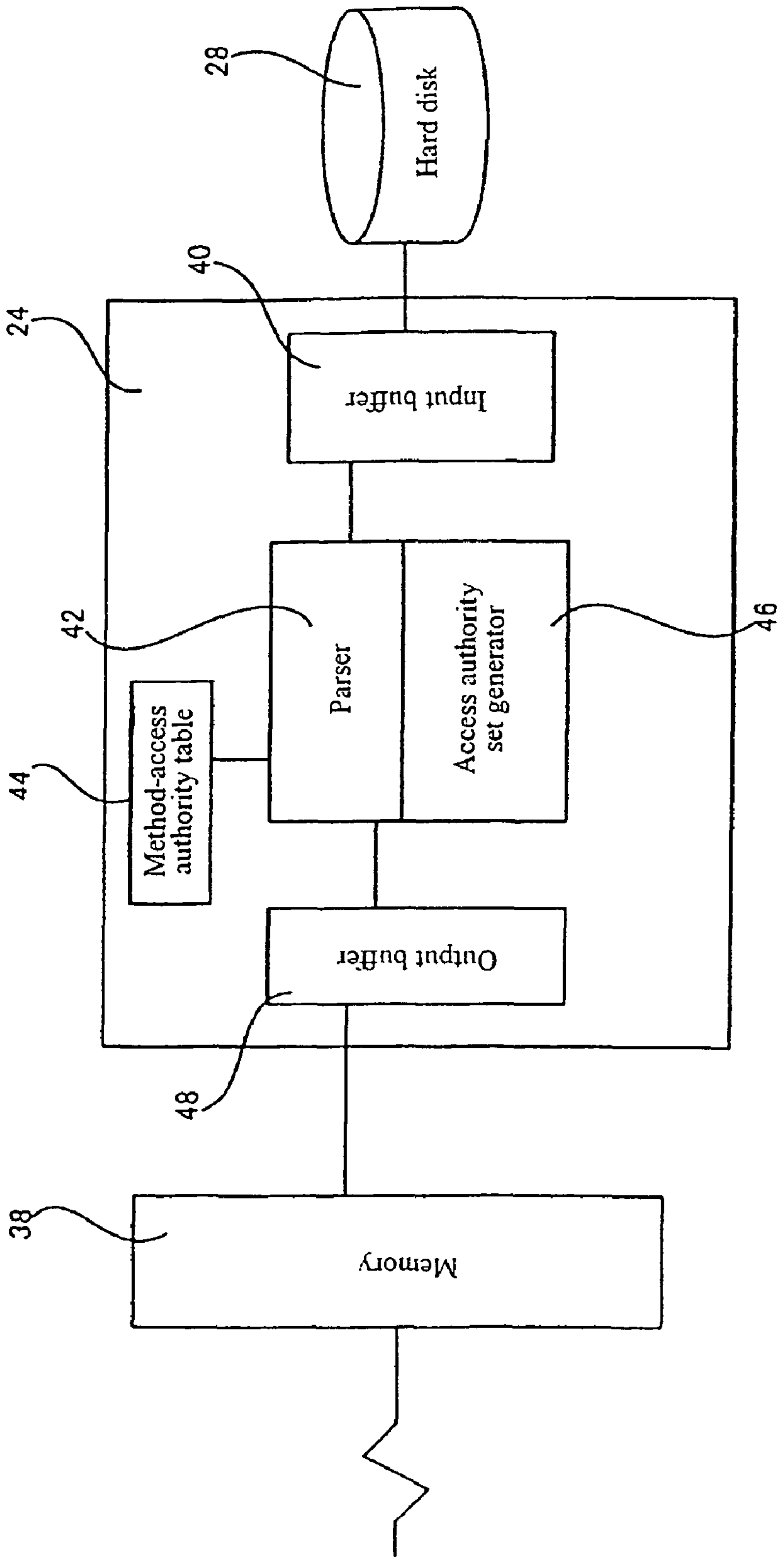

[Figure 4]
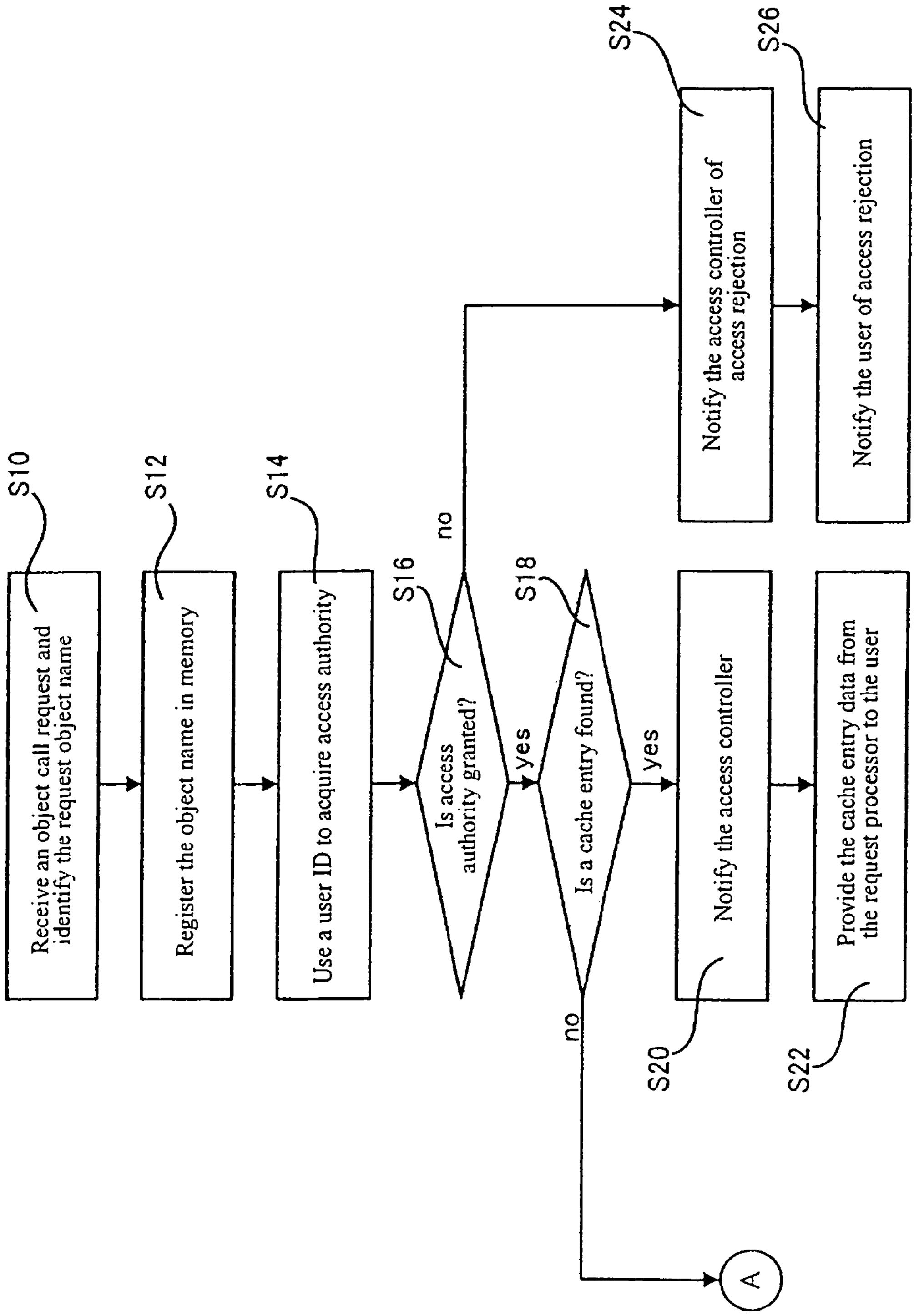

[Figure 5]
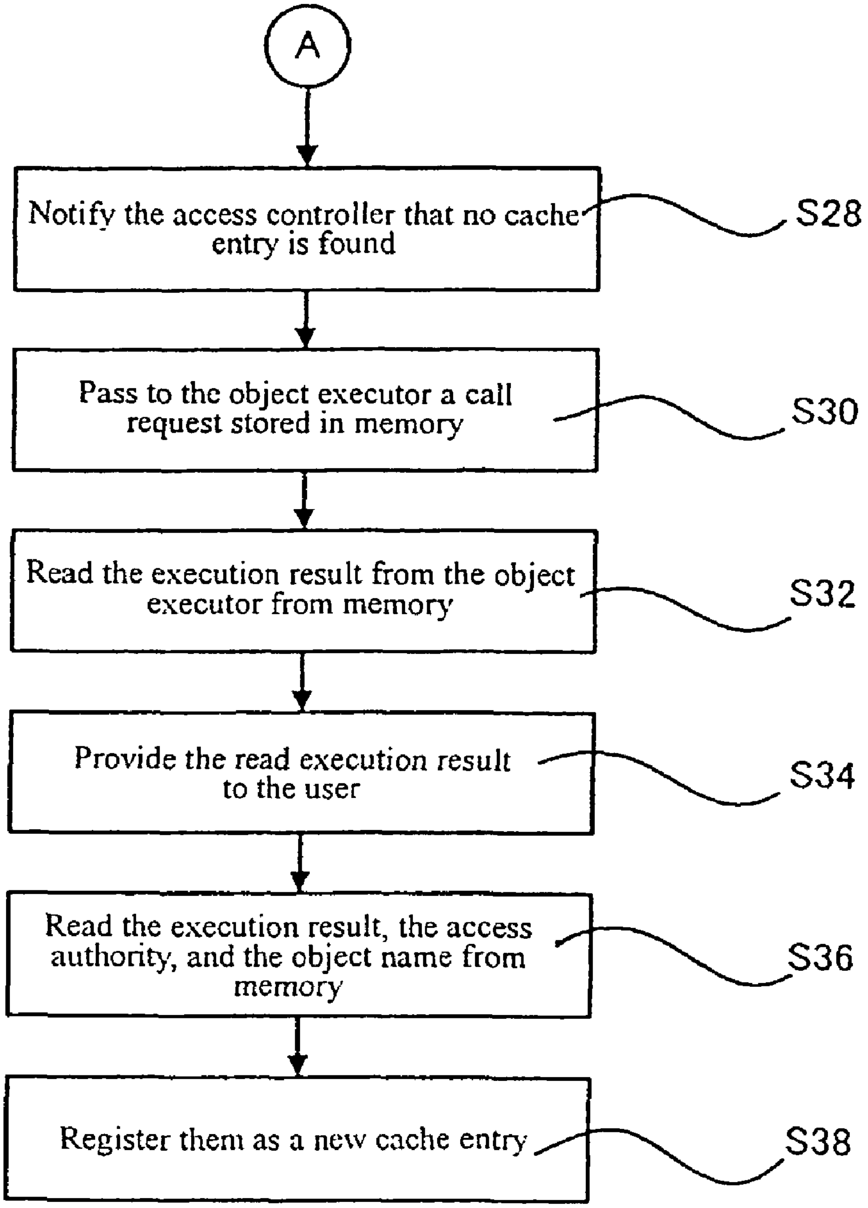

[Figure 6]

| User ID | Access authority | |
|---|---|---|
| usdxxhnm | gold | A, C, D, ···, X |
| usboojkn | gold | A, B, M, ···, X |
| bbiooean | bronz | B, C, M, ···, Y,Z |
| ⋮ | ⋮ | ⋮ |
| xjmbiwmka | silver | B, J, M, ···, X,Z |
| Ibm123trl | bronz | D, E, F, ···, O,... |

[Figure 7]
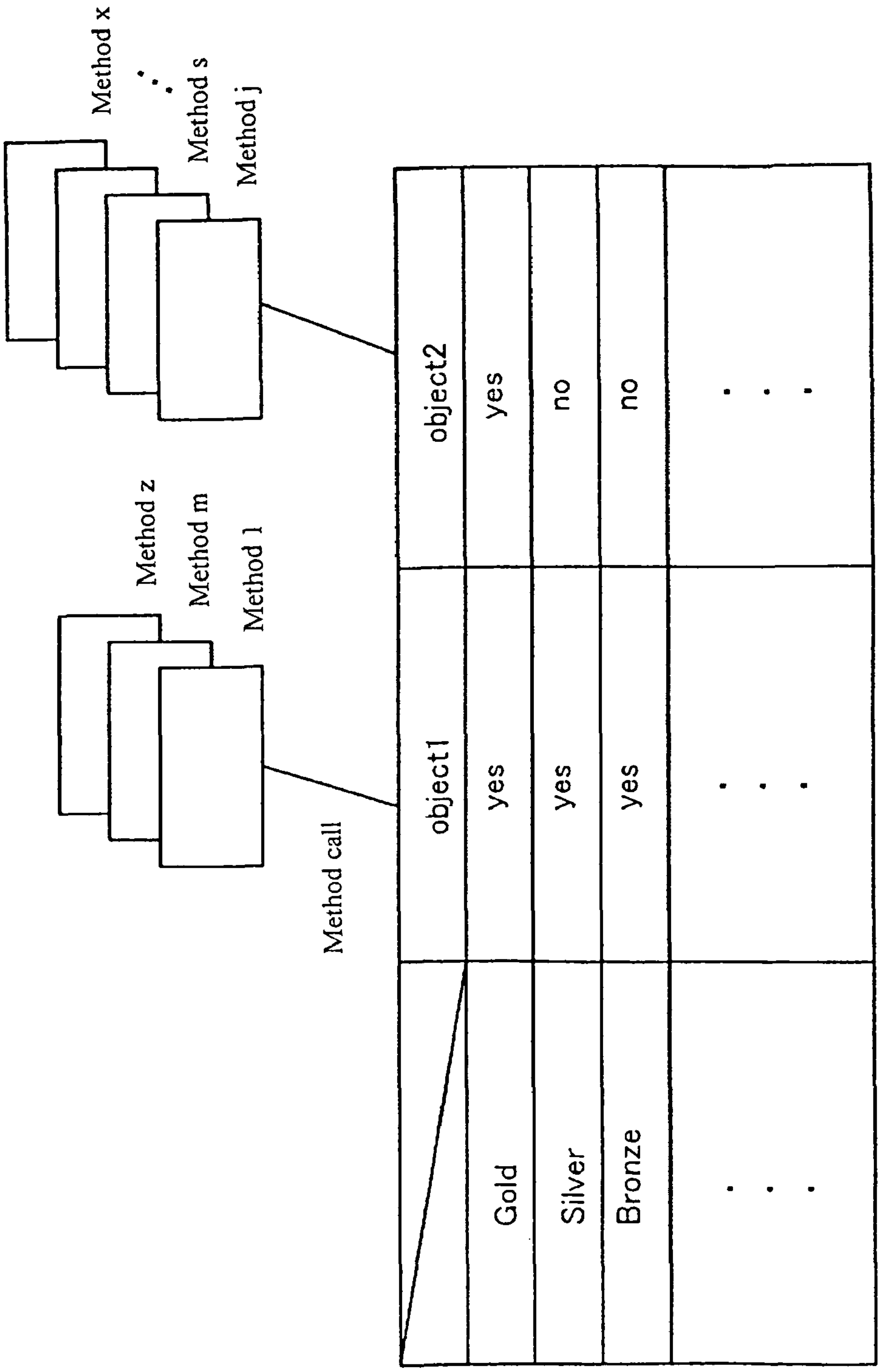

[Figure 8]

| | Method 1 | Method 2 | ... | Method i |
|---|---|---|---|---|
| Gold | yes | yes | | yes |
| Silver | yes | no | | yes |
| Bronze | no | no | | no |
| A | yes | yes | | yes |
| B | no | yes | | no |
| C | no | no | | no |
| ⋮ | ⋮ | ⋮ | | |

[Figure 9]

| Object name | Access authority set | Execution result | |
|---|---|---|---|
| getweatherForecast () | {(G,S),···,(A)} | Execution result 1 | 36b |
| getweatherForecast () | {(B), (A)} | Execution result 2 | |
| getDetailedInfo () | {(G),···,(X,Y,Z)} | Execution result 3 | 36a |
| getStockRecommendation () | {(G,B), (S), ···, (Y)} | Execution result 4 | |
| getStockRecommendation () | {(S), (S,B), ···, (Y)} | Execution result 5 | 36 |
| ⋮ | ⋮ | ⋮ | |

[Figure 10]

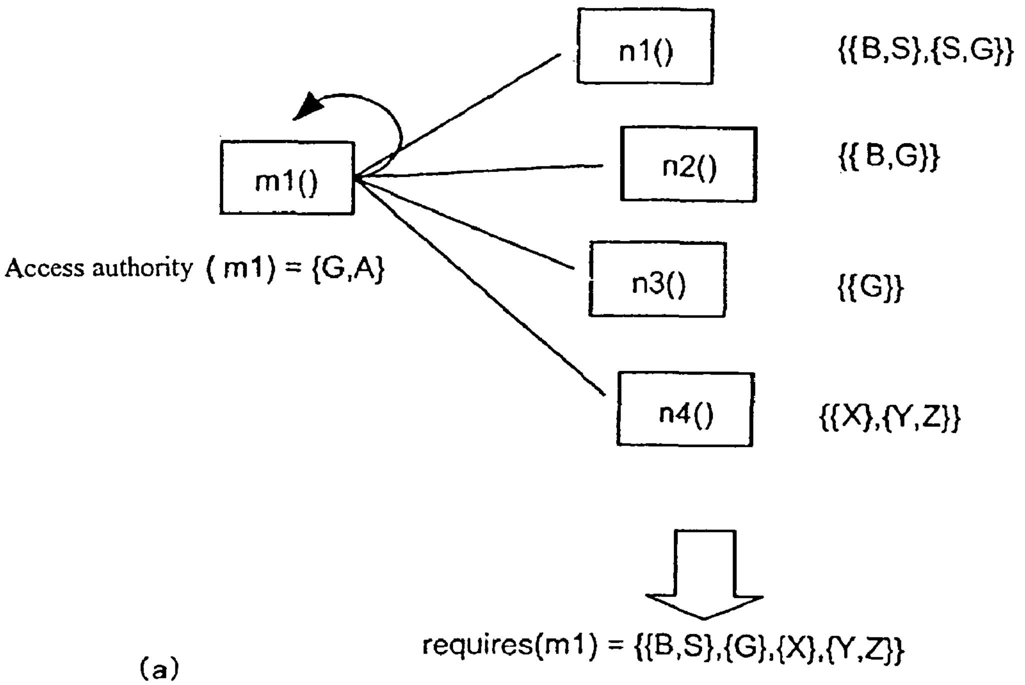

(a)

$$requires(m) \cong \{permission(m)\} \oplus \bigcup_{i}^{\oplus} requires(n_i)$$

$$A \oplus B \cong \{r \in A \cup B \mid \neg(\exists s \in A \cup B; r \prec s)\}$$

$$r \prec s \Leftrightarrow r \cup s = s \wedge r \neq s$$

$$\bigcup_{i}^{\oplus} N_i \cong N_1 \oplus N_2 \oplus \ldots \oplus N_n$$

$$unknown(m) \Rightarrow permission(m) \cong \varnothing$$

$$safe(m) \Leftarrow \forall r \in requires(m); r \cap p \neq \varnothing$$

p := the roles - set of an accessing principal (b)

[Figure 11]
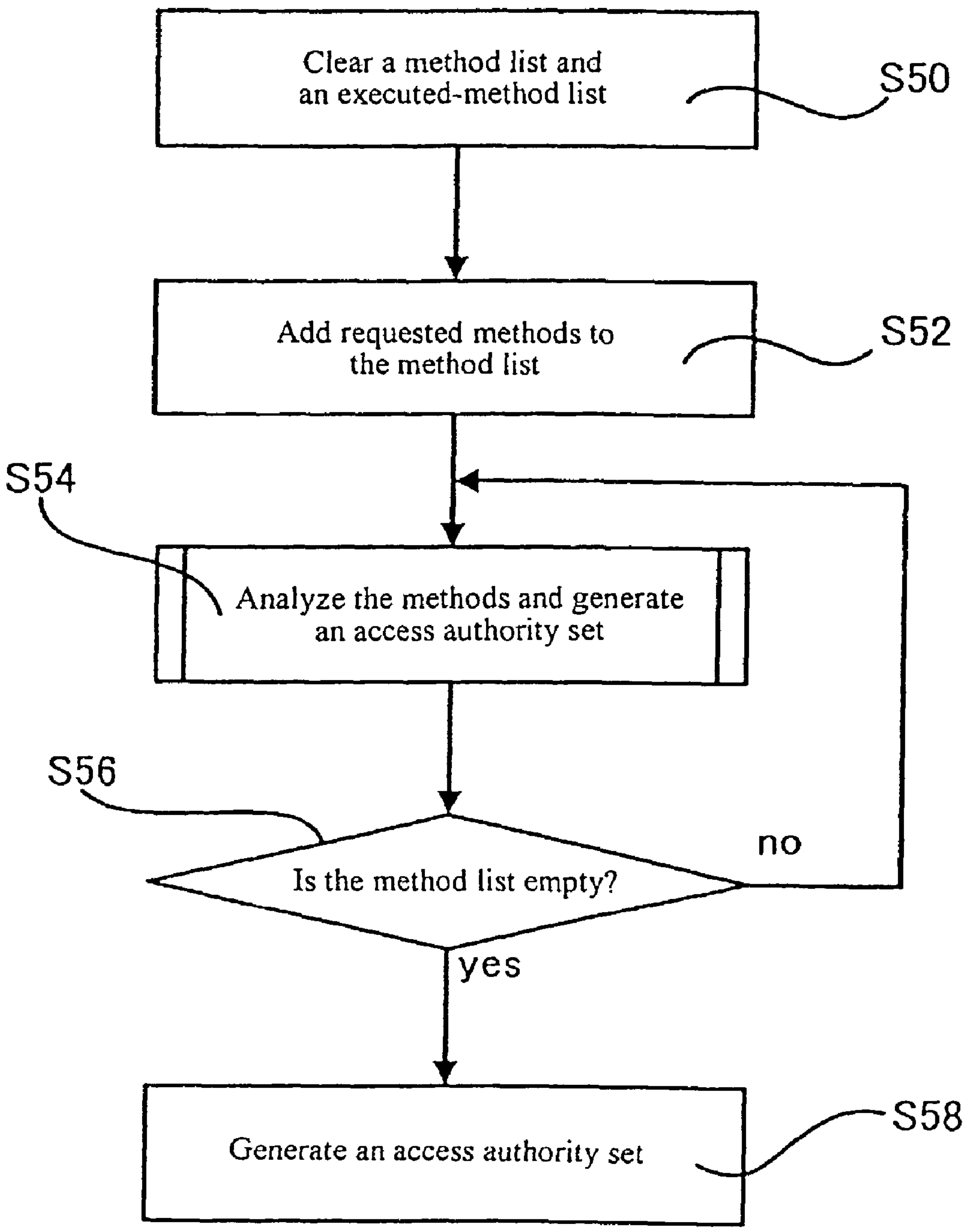

[Figure 12]
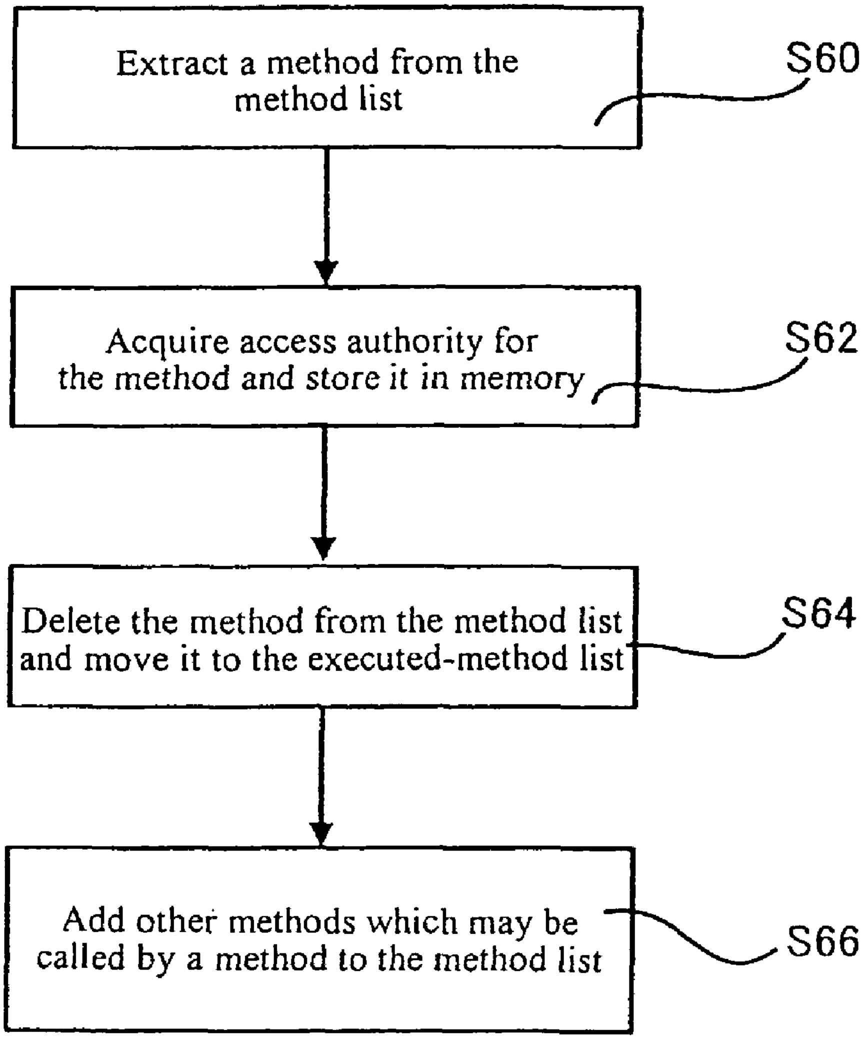

[Figure 13]

```
Set<Method> todo-list = {}
Set<Method> done-list = {}
Set<Set<Role>> result = {}

requiredRoles(method)

requiredRoles(Method m) {
    Set<Set<Role>> result = {}
    foreach Method n in depends(m) {
        if (n not in done-list) {
            add n to done-list
            add roles allowed for n to result (maybe by taking an optimized form)
            // may optimize result
            requiredRoles(n)
        }
    }
}
```

Set<Set<Role>> represents a set of a set of Role sets.

The depends() returns all of methods that may be directly invoked from the given method.

[Figure 14]
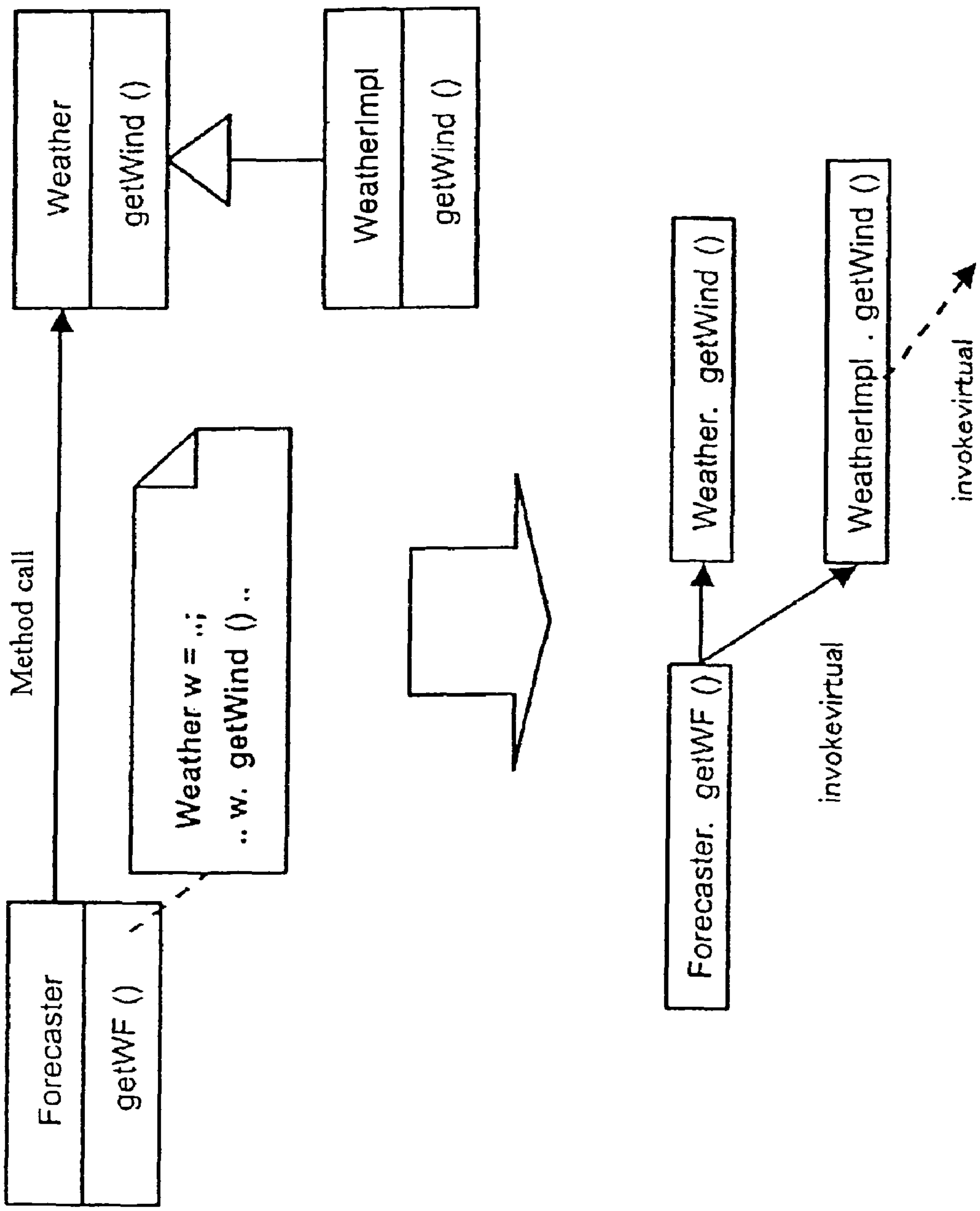

[Figure 15]
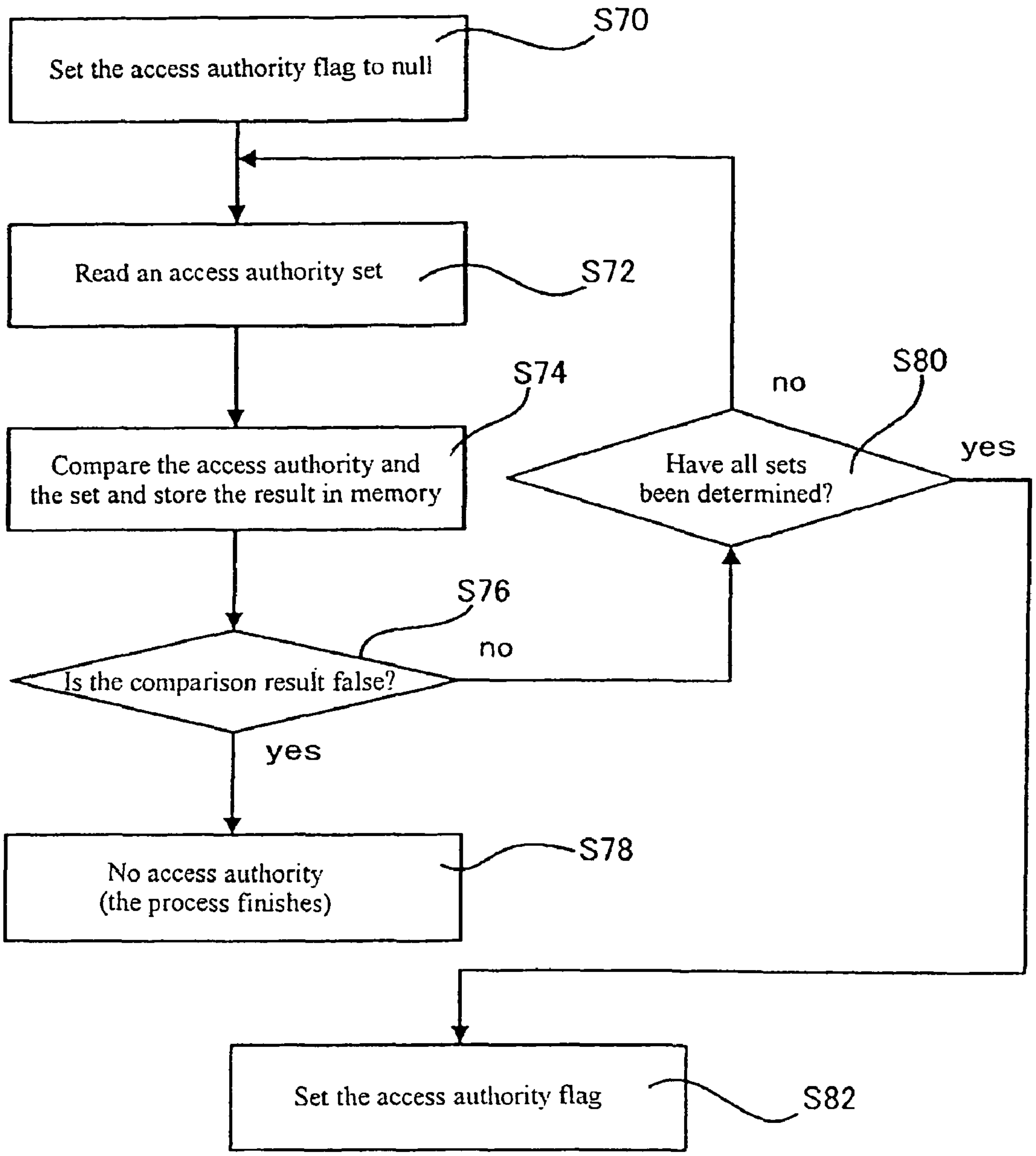

[Figure 16]

```
Principal p
Set<Set<Role>> roleCondition = { (A, B), (B, C), (X, Y, Z) }

if compliesWith(roleCondition) then success else failure

boolean compliesWith(Set<Set<Role>> roleCondition) {
      foreach Set<Role> allowedRoles in roleCondition {
         if not isInAnyOf(allowedRoles) return false
      }
      return true
}

boolean isInAnyOf(Set<Role> allowedRoles) {
      foreach Role role in allowedRoles {
        if p in role then return true
      }
      return false
}
```

[Figure 17]
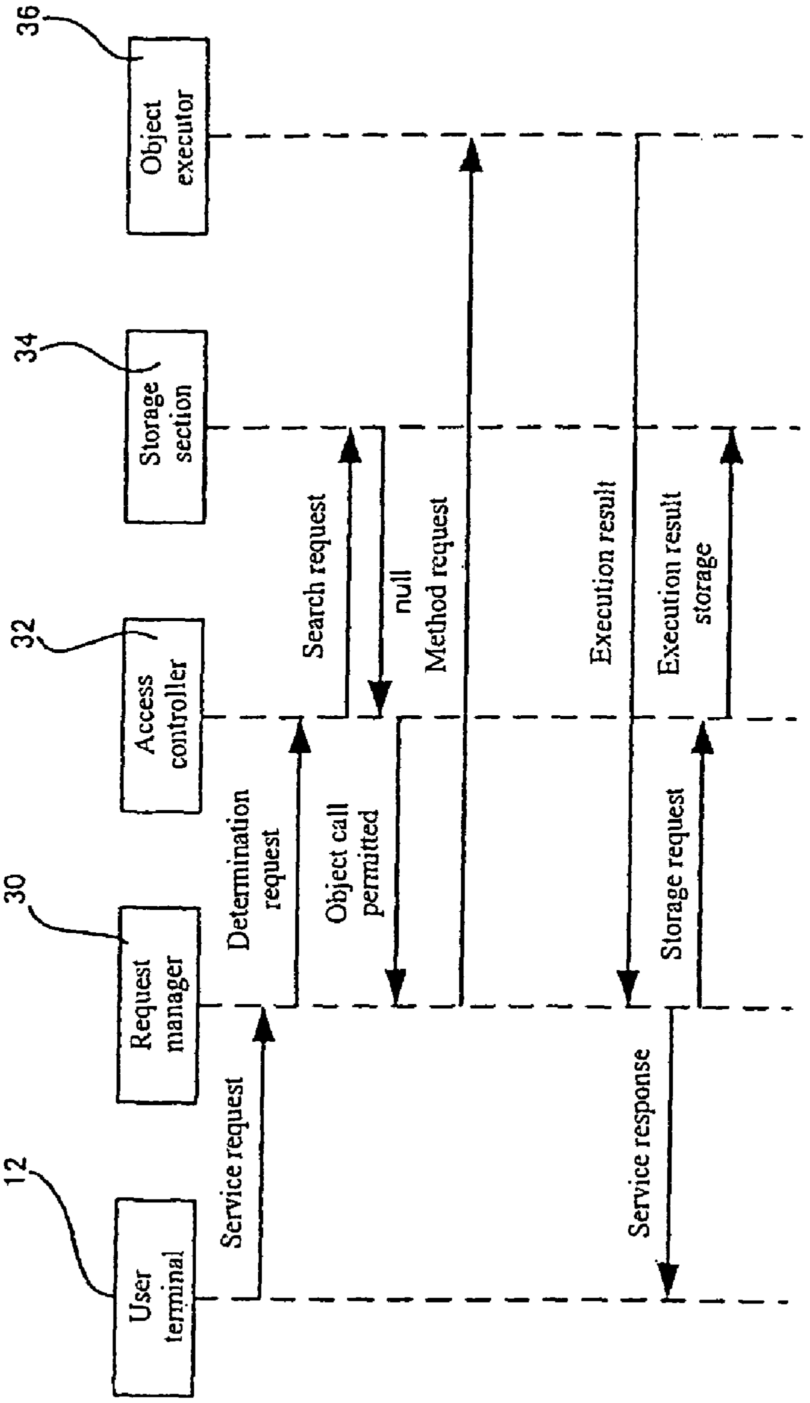

[Figure 18]
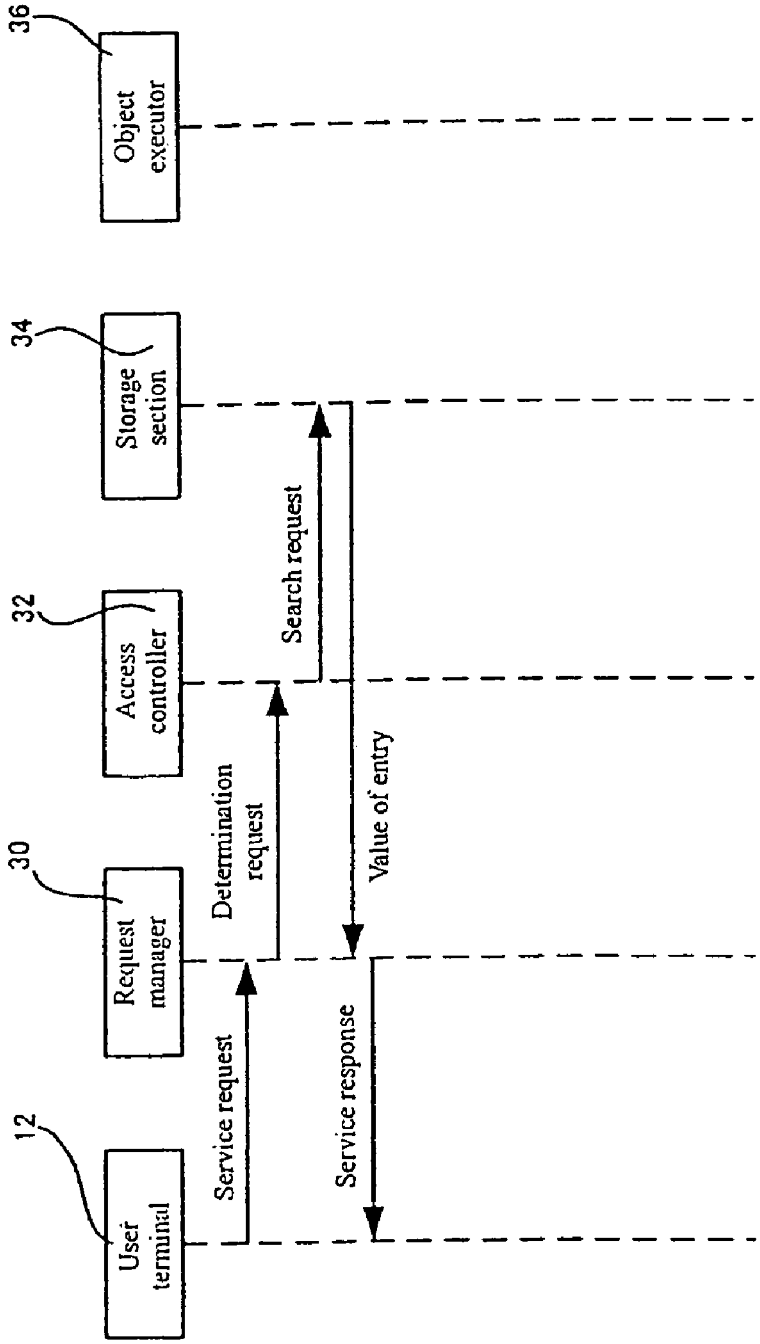

[Figure 19]
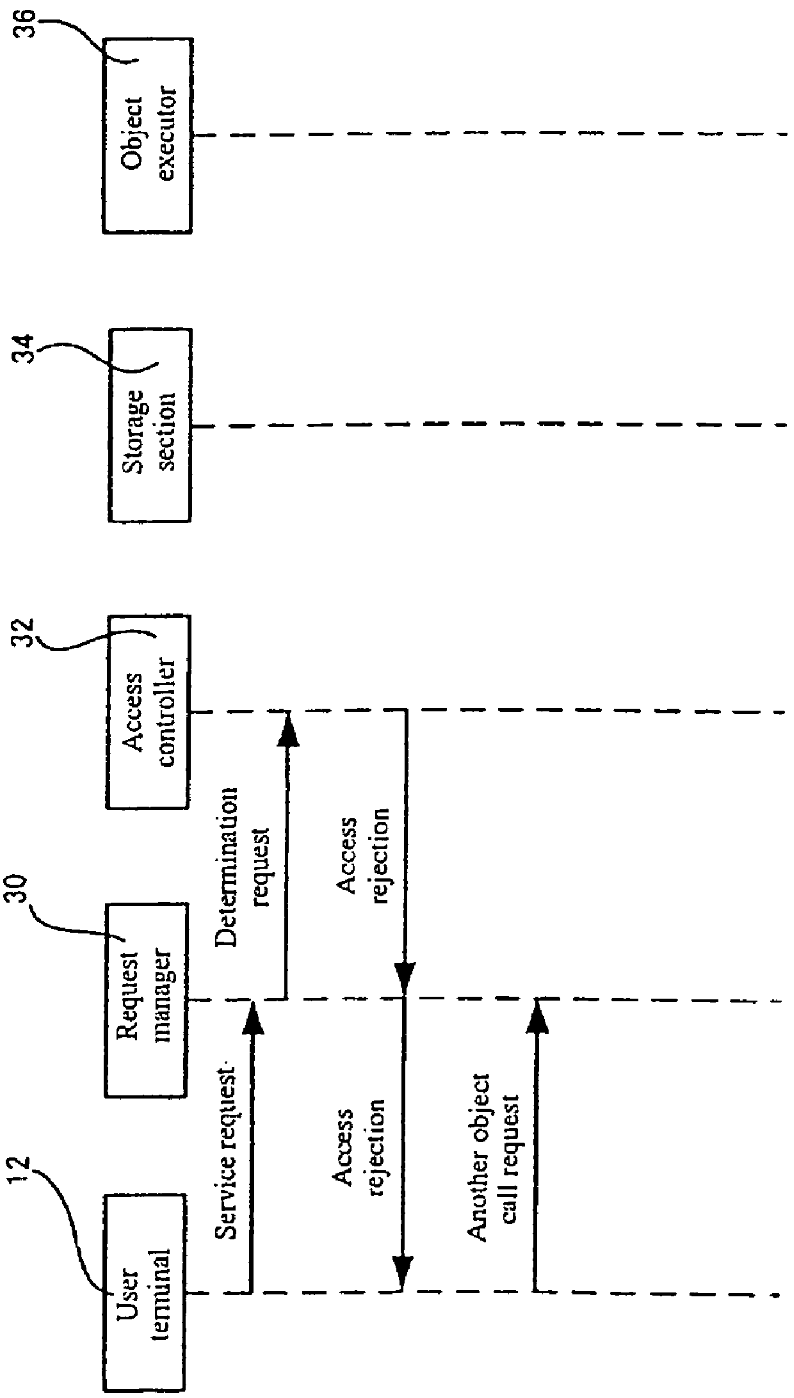

[Figure 20]
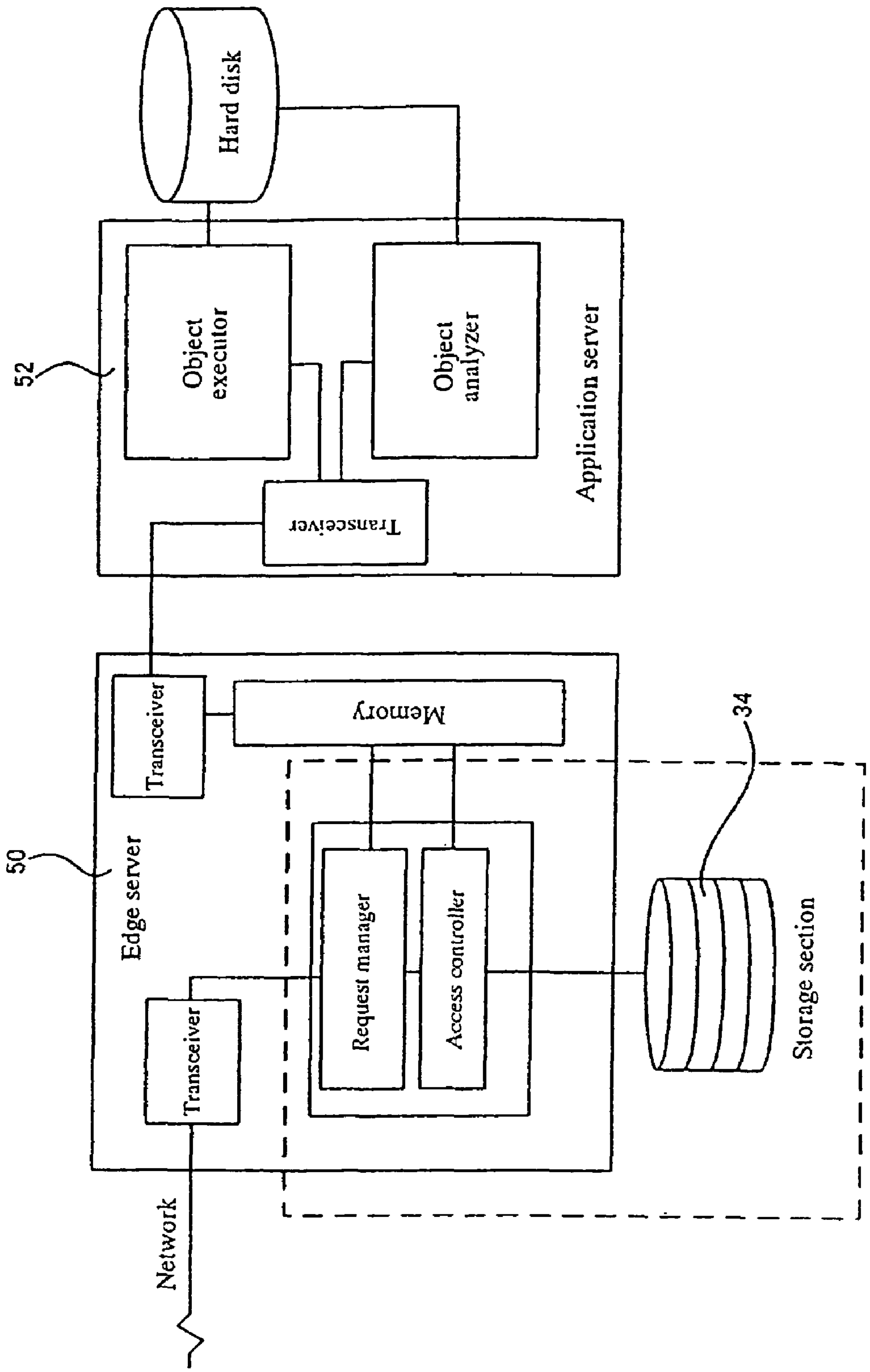

[Figure 21]
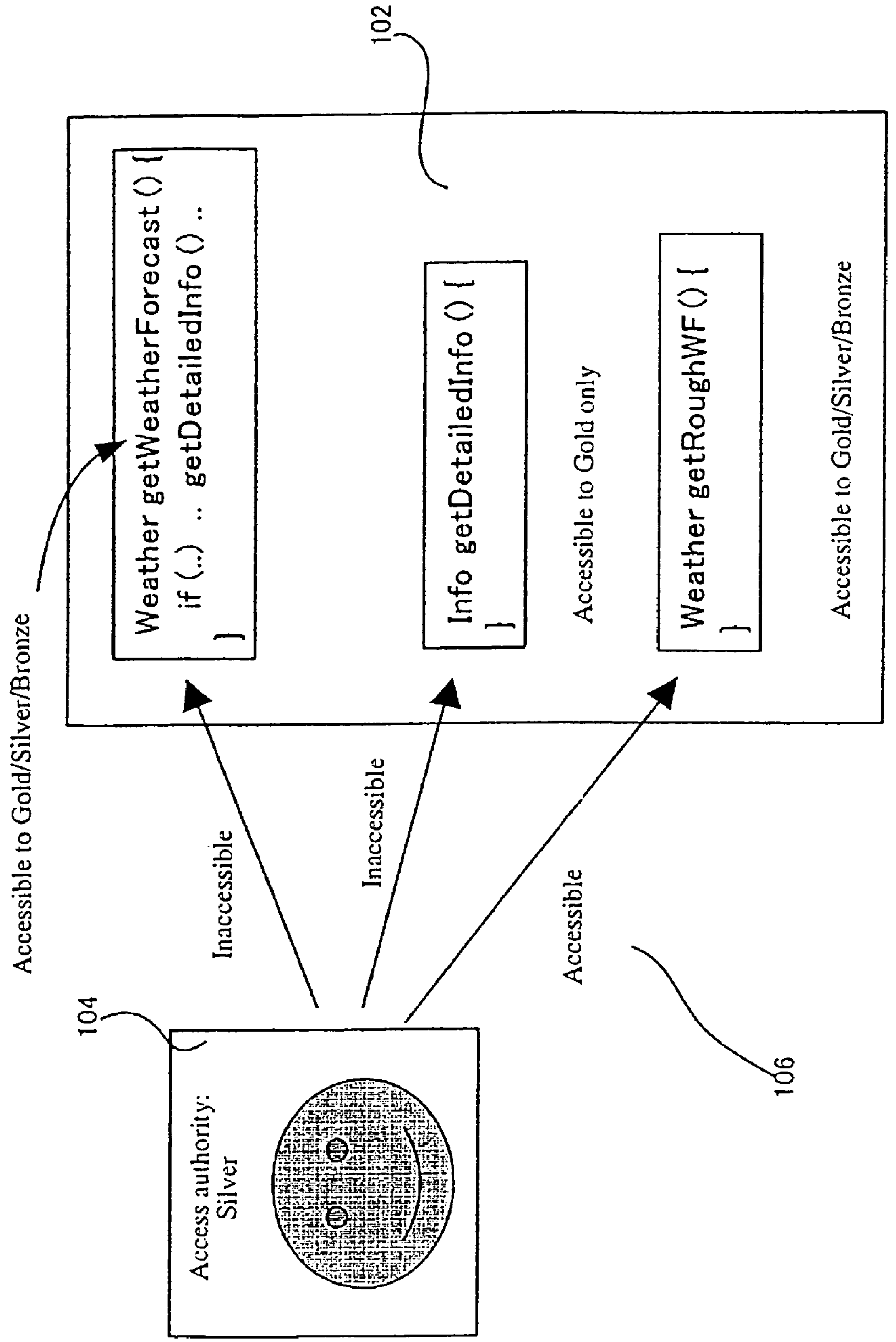

[Figure 22]
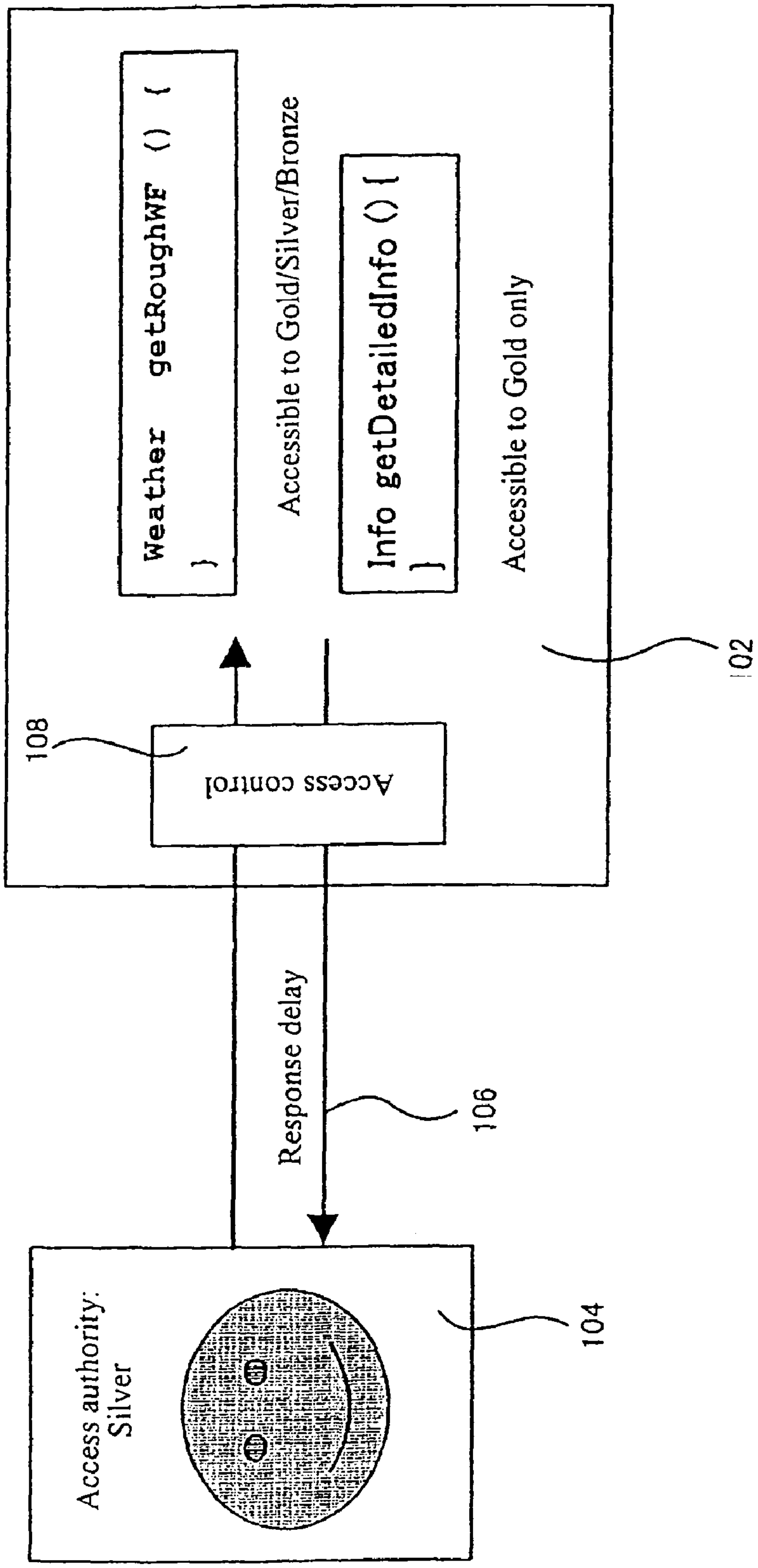

[Figure 23]
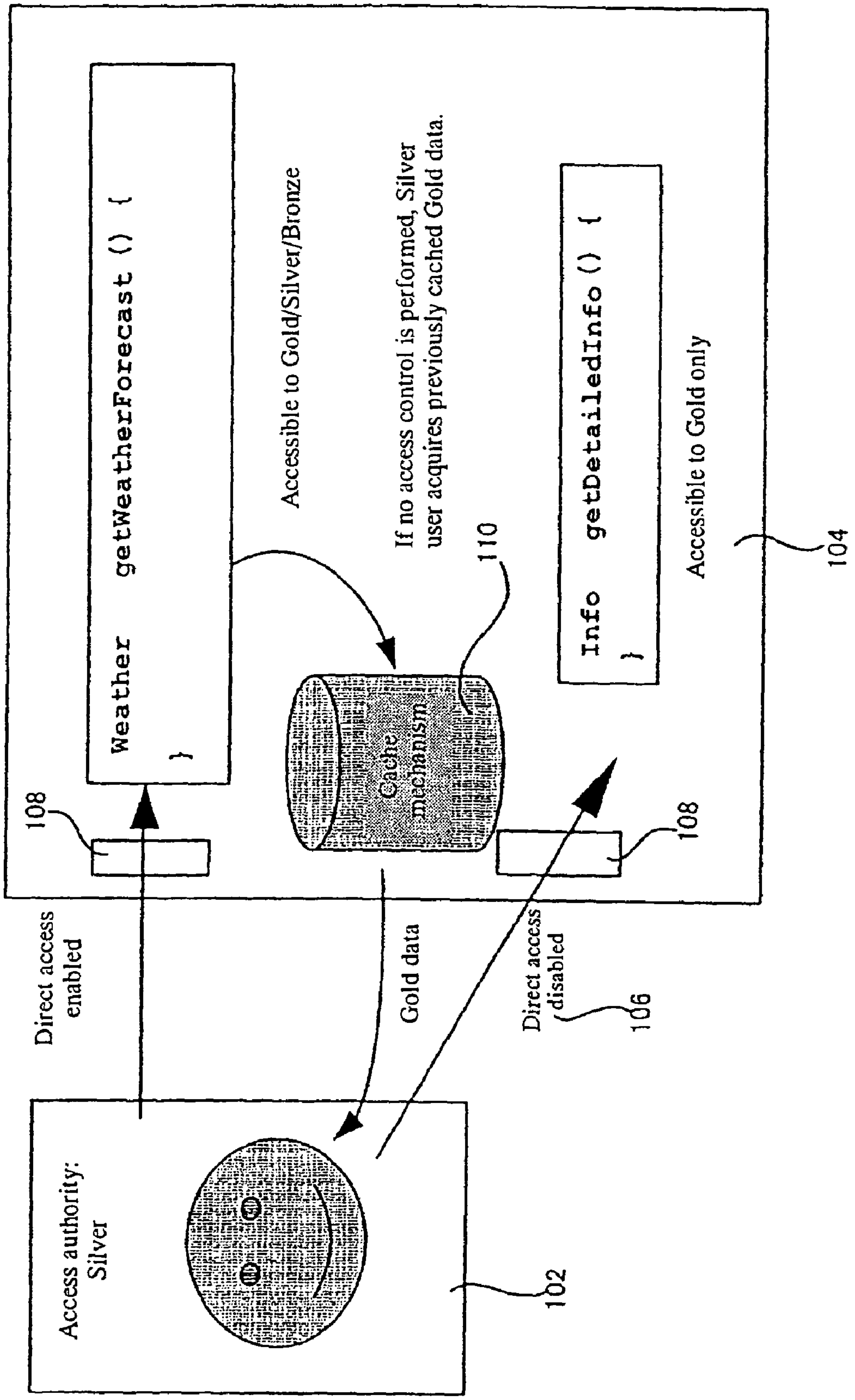

PROCESSING CALL REQUESTS WITH RESPECT TO OBJECTS

RELATED APPLICATIONS

This application is a National Stage filing under 35 U.S.C. §371 of International Application No. PCT/JP2003/016130, filed on Dec. 16, 2003, which claims the benefit under 37 U.S.C. 365(b) of Japanese Application No. JP2002/366489, filed Dec. 18, 2002.

FIELD OF THE INVENTION

The present invention relates to efficiently providing Web services and, more particularly, to a Web service providing system, a server unit used therefore, a control method for controlling a computer system as a server unit used for a Web service providing system, and a program and a recording medium for executing said control method, which can allow Web services to be provided to a user with high speed and reliability based on Web service information previously viewed by the user and which can provide a high degree of flexibility in access authority changes made by the user and Web service access authority changes made by Web service providers.

BACKGROUND ART

There are known cache mechanisms used for Web services capable of providing various contents ranging from static contents such as simply displayed Web pages to dynamic contents such as Java® Service Provider (JSP) pages. For example, such cache mechanisms used to provide Web services include a WebSphere Dyna cache. A prior known cache mechanism can have an improved responsibility by storing the results of previous executions and returning the previous execution results stored therein to a user rather than actually executing a service object when the user accesses a Web service again.

It may be often preferable for a Web service provider to limit user access to its service depending on the user and there are also known access control mechanisms to limit access according to the user's access authority. More specifically, for example, when a Web site is built to provide a bank's ATM services, a user can be classified as a Gold, Silver, or Bronze member (hereinafter referred to as access authority) according to the user's credit or long-term deposit to take advantage of available high-value-added services. In this case, a Bronze member is an ordinary customer and Silver and Gold member users of higher grades can take higher-value services. In addition to usual deposit operations, Web services as described above may include providing stock (weather) information differentiated according to the access authority, entertainment information, and real estate information.

Specifically, the above-described access limiting features used in providing Web services according to the user's access authority may include the HTTP Basic Auth and the EJB access control mechanism which can control access for individual methods based on access authority.

FIG. 21 schematically shows the process of a Web service providing system which includes a prior access control mechanism. FIG. 21 is a schematic drawing for showing the process of the prior access control mechanism. The access control mechanism in the Web service providing system shown in FIG. 21 is provided for a server unit 102 which provides Web services and the user accesses the server unit 102 from a user terminal 104 such as a computer, a cellular telephone, or a PDA through a network 106 such as a wired network, a wireless network, or a composite network which contains both of them. Access authorization for the server unit 102 is usually accomplished by combining a public key and a private key, that is, code for user identification (hereinafter referred to as user ID) and a password. When the server unit 102 performs the user authentication, an application request sent by the user, for example, an object call request to make a request to call an application called "Weather" which provides weather forecast information is provided to the server unit 102.

The application Weather can also allow for calling a method RoughWF( ) to provide the user with rough weather forecast according to the user's access authority, a method WeatherForecast( ) to provide more diversified and high-value-added information, and other methods. The user is granted access authority of Gold, Silver, or Bronze as described above, for example, under a contract with a service provider. In the prior art shown in FIG. 21, the user having Silver access authority accesses the server unit 102 from the user terminal 104. The user acquires an execution result corresponding to the user's Silver access authority through a method Weather getRoughWF( ) and the execution result is provided to the user through a browser software.

In the Weather application, a Gold user is also permitted to call another method getWeatherForecast( ) and in addition, to call still another method getDetailedInfo within the first method, so that the user can have access to higher-value Web services. FIG. 21 shows that only a user having Gold access authority can acquire the data of getDetailedInfo( ) and that the user having Silver access authority cannot receive, for example, an execution result from the method getDetailedInfo( ).

As shown in FIG. 21, it is assumed that the methods getRoughWF( ) and getWeatherForecast( ) are accessible to the user having Gold or Silver access authority. It should be noted that even the user who has access to a first method does not always have access to a second method to be called within the first method. In FIG. 21, getWeatherForecast( ) is an example of the first method and the method getDetailedInfo( ) to be called within the method getWeatherForecast( ) is not accessible to the user of Silver access authority. Therefore, if getDetailedInfo( ) is called to return an execution result, the execution result from the method getWeatherForecast( ) must not be returned to the user of Silver access authority. On the other hand, the method getRoughWF( ) can return its execution result to the user of Silver access authority, since any method which is not accessible to the user having Silver access authority is not subsequently called.

FIG. 22 shows other disadvantages of the prior access control mechanism shown in FIG. 21. In FIG. 22, similarly to FIG. 21, the user accesses the server unit 102 from the user terminal 104 through the network 106. FIG. 26 shows an access control feature 108 contained in the server unit 102 and, for example, if the user of Silver access authority enters into the server unit 102 a request which is accessible to a Gold user only, the access control feature 108 inhibits the execution of the request to prevent the user of Silver access authority from improperly accessing any service which requires Gold access authority.

On the other hand, the user having Silver access authority can acquire an execution result from a method Weather getRoughWF( ) which is accessible to the user of Silver access authority. The user of Silver access authority can acquire such authorized data but there will be a time delay until the data is displayed on browser software, since the server unit 102 must perform access control each time any method which requires access control is called for execution. These disadvantages may depend on the server unit's ability and process complexity and thus, they could not be improved even with wide spread of ADSL, optical communication, and other broadband communication technologies or higher communication speeds achieved between the server unit and the user terminal.

In order to improve the prior disadvantages described above, a cache mechanism can be introduced into the server unit 102. FIG. 23 shows a system wherein a cache mechanism is introduced in addition to the prior access control mechanism.

The system shown in FIG. 23 is configured to contain a cache mechanism 110 in the server unit 102 and to store an execution result from an object called by an object call request transmitted by the user in the cache mechanism 110. When the server unit 102 comprises the cache mechanism 110 and the access control mechanism 108 as shown in FIG. 23, the user can exercise proper access authority for a service which requires the access authority to acquire an execution result. In addition, since the execution result acquired by the user is stored in the cache mechanism 110, the user who requests the same object call as that previously requested can easily acquire the previous execution result stored in the cache mechanism. Subsequent processes can be also easily executed based on the execution result from the cache mechanism. However, a system without any cache mechanism has been adopted for a Web service involving prior access control from the reasons described later.

More specifically, consider that both the cache mechanism 110 and the access control mechanism 108 are used with the server unit 102 as shown in FIG. 23. If the cache mechanism 110 permits the user access irrespective of the user's access authority, a problem arises in which an execution result stored in the cache mechanism will be provided to the user who requests the same service, irrespective of the user's access authority. When such access to the cache mechanism is permitted without access authority, in spite of access control for a Web service, high-value-added information or user awards which must be otherwise provided according to the class of access authority may be inadvertently provided to a user having no access authority through the cache mechanism, resulting in loss of effectiveness and attractiveness of high-value-added Web services.

Thus, there will be a need to control access to the cache mechanism with respect to the user's access authority. However, if the user's access authority is determined for each method called by an object call request from the user and then access control is performed on the cache mechanism and on a Web service simultaneously, the process may become very time-consuming. This is against the purpose of the design for providing to the user a fast display of execution results by means of the cache mechanism. In addition, it is preferable to be able to easily avoid any high-value-added information leakage caused by access to the cache mechanism when the user's access authority or the service provider's access conditions are changed. Therefore, from the viewpoint of improved capabilities of providing Web services to the user, it is highly desired that the access control and cache mechanisms are used simultaneously to provide as many Web services as possible with a high degree of reliability.

The present invention is devised in view of the disadvantages of the prior art described above and it is an object of the present invention to provide a Web service providing system which can provide high-value-added Web services as quickly as possible with a high degree of reliability. It is another object of the present invention to provide a server unit which can provide the above-described Web services. It is still another object of the present invention to provide a server unit control method which can cause a computer system to function as the above-described server unit. It is still another object of the present invention to provide a program to cause a computer system to function as the above-described server unit and a computer-readable recording medium on which said program is recorded.

SUMMARY OF THE INVENTION

The present invention is based on the concept described below. Firstly, each object permitted by a Web service is analyzed in advance and access authority for a method called by the object is acquired to generate an access authority set and then, correspondences between object and access authority set are established. Thus, when a user who is granted predetermined access authority requests a Web service, the access authority set corresponding to the request object requested by the user and the user's access authority can be compared to allow a server unit to have a capability of permitting access to a cache mechanism, and hence, high-speed and high-reliability Web services can be provided.

For the purpose of the present invention, in order to implement the above-described features, Java® code is analyzed in advance to list all methods which may be called to complete the execution of predetermined services. Subsequently, access authority is listed for all the listed methods to generate a list of access authority sets for possible objects (hereinafter referred to as object-access authority list) for storage in advance. The list is used to determine the access authority of a user who requests a Web service for a request object to authorize the user to access a cache mechanism only if the user is an authorized user according to the list, and then, an execution result which has been stored for a previously executed object (hereinafter referred to as cache entry) is returned as an execution result. A server unit according to the present invention will not return to the user a cache entry value corresponding to the execution result for a method for which the cache mechanism is otherwise inaccessible. If no previous execution result is cached for the object, the cache mechanism passes the object call request from the user to an object executor to allow the user to acquire an appropriate execution result within the scope of the user's access authority.

In order to allow the server unit to have the above-described features, the present invention provides means for analyzing an object for execution of a Web service, acquiring access authority corresponding to methods which may be called, and thus extracting an access authority set required to execute the object. The generated access authority set is stored as a list corresponding to each object and is read out to determine whether the user has access to a cache entry, that is, the accessibility of the cache entry to the user is determined.

The above-described object analysis extracts necessary access authority and more specifically, identifies all methods to be called in calling a predetermined object for an object program such as EJB which is available as a package of code and configuration files. Then, access authority assigned to these methods is collected to produce a list of access authority sets. According to the present invention, access to a cache entry is granted only to a user who holds access authority required for all methods which may be called for an application and thus, a high degree of reliability can be provided.

In the present invention, the cache mechanism and the object analysis mechanism are completely independent of each other, so that an administrator can, on his own authority, specify user authority required for the cache mechanism under easier conditions based on analyzed information, and in addition, any change involved in upgrading or downgrading the user's access authority can be accomplished by simply changing the user's access authority without any additional mechanism provided for the access mechanism used to access the cache mechanism, and hence, high-speed and high-reliability Web services can be provided.

More specifically, according to the present invention, a Web service providing system comprising a server unit for providing Web services through a network is provided, wherein the above-described server unit comprises:

control means for acquiring an object call request received through the above-described network and a user identifier and causing the acquired object call request to be stored and for comparing access authority specified by the above-described user identifier and an access authority set for all methods which may be called by a request object; and a storage section for storing execution results for a previously executed object;

wherein, if the above-described storage section stores execution results for the above-described request object previously executed, the above-described control means transmits the execution results for the stored previous request object outside the above-described server unit through the above-described network, prior to executing the above-described request object.

According to the present invention, if the access authority specified by the above-described user identifier is contained in the above-described access authority set, the above-described control means causes the above-described storage section to be searched. According to the present invention, the above-described server unit further comprises object execution means and if the above-described storage section contains no corresponding previous execution results, the above-described control means sends the above-described object call request to an object executor to cause it to execute the above-described request object. In the present invention, the above-described server unit consists of an edge server comprising the above-described control means and an application server comprising the above-described object executor.

According to the present invention, a server unit for providing Web services through a network is provided, wherein the above-described server unit comprises:

control means for receiving an object call request and causing it to be stored and for comparing access authority for a request object and an access authority set for all methods which may be called by the request object; and a storage section for storing execution results for a previously executed object;

wherein, if the above-described storage section stores execution results for the above-described request object previously executed, the above-described control means transmits the execution results for the stored previous request object outside the above-described server unit through the above-described network, prior to executing the above-described request object. In the present invention, if the access authority specified by the above-described user identifier is contained in the above-described access authority set, the above-described control means causes the above-described storage section to be searched.

According to the present invention, a server unit for providing Web services through a network is provided, wherein the above-described server unit comprises:

object analyzer means for acquiring all methods which may be called by a request object to generate an access authority set;

object execution means for executing the above-described request object; and a cache mechanism configured to comprise a storage section which stores execution results for a previous object and using the above-described access authority set to perform access control on the above-described storage section in response to the above-described object call request.

In the present invention, the above-described cache mechanism can be configured to comprise:

a request manager; and an access controller for controlling a search for execution results for a previous request object stored in the above-described storage section. In the present invention, the above-described access controller compares access authority for the above-described request object and the above-described access authority set to perform access control; and in response to the above-described access controller's determination, the above-described request manager can pass the above-described object call request to the above-described object executor to control execution of the above-described request object. In the present invention, the above-described object analyzer means can further comprise means for acquiring a method which may be called by the above-described object from object code, and means for acquiring access authority corresponding to the above-described method, and means for generating the above-described access authority set from access authority for all methods which may be called by the above-described object and causing it to be stored.

According to the present invention, a server control method for causing a computer system to function as a server unit for providing Web services through a network is provided, wherein the above-described method causes the above-described computer system to perform the steps of:

receiving and storing an object call request;

acquiring access authority for a request object from memory;

reading an access authority set for execution of the above-described request object from the memory;

determining whether the above-described access authority is contained in the above-described access authority set; and if the above-described access authority is contained in the above-described access authority set, prior to executing the above-described request object, searching a storage section which stores execution results for a previous object.

In the present invention, the above-described computer system can be caused to perform the step of, if the above-described storage section stores execution results for a request object previously executed, transmitting the execution results for the stored previous request object outside the above-described server unit through the above-described network, prior to executing the above-described request object. In the present invention, the above-described computer system can be also caused to perform the step of, if the above-described storage section stores no execution results for a request object previously executed, passing the above-described object call request to an object executor.

According to the present invention, a program for causing a computer system to function as a server unit for providing Web services through a network is provided, wherein the above-described program causes the above-described computer system to perform the steps of:

receiving and storing an object call request;

acquiring access authority for a request object from memory;

reading an access authority set for execution of the above-described request object from the memory;

determining whether the above-described access authority is contained in the above-described access authority set; and if the above-described access authority is contained in the above-described access authority set, prior to executing the above-described application, searching a storage section which stores execution results for a previous object.

According to the present invention, a computer-readable storage medium which stores a program for causing a computer system to function as a server unit for providing Web services through a network is provided, wherein the above-described program causes the above-described computer system to perform the steps of:

receiving and storing an object call request;

acquiring access authority for a request object from memory;

reading an access authority set for execution of the above-described request object from the memory;

determining whether the above-described access authority is contained in the above-described access authority set; and if the above-described access authority is contained in the above-described access authority set, prior to executing the above-described application, searching a storage section which stores execution results for a previous object.

According to the present invention, a program for causing a computer system to function as a server unit for providing Web services through a network is provided, wherein the above-described program causes the above-described computer system to perform the steps of:

reading from memory an access authority set generated from access authority for all methods which may be called by a request object; and using certain access authority for the above-described request object and the above-described access authority set to control access to previous execution results for an object stored in a storage section.

According to the present invention, a computer-readable storage medium which stores a program for causing a computer system to function as a server unit for providing Web services through a network is provided, wherein the above-described program causes the above-described computer system to perform the steps of:

reading from memory an access authority set generated from access authority for all methods which may be called by a request object; and using certain access authority for the above-described request object and the above-described access authority set to control access to previous execution results for an object stored in a storage section.

BRIEF DESCRIPTION OF THE DRAWINGS

FIG. 1 schematically shows the configuration of a Web service providing system according to the present invention;

FIG. 2 shows the functional blocks of a server unit according to the present invention;

FIG. 3 shows the functional blocks of an object analyzer according to the present invention;

FIG. 4 shows a flowchart for the process of a cache mechanism according to the present invention;

FIG. 5 shows a flowchart for the process of the cache mechanism according to the present invention when no cache entry is found;

FIG. 6 shows an embodiment of a user-access authority table according to the present invention;

FIG. 7 shows an embodiment of an object-access authority list according to the present invention;

FIG. 8 shows an embodiment of a method-access authority table according to the present invention;

FIG. 9 shows the configuration of a cache entry according to the present invention;

FIG. 10 schematically shows the process of generating an access authority set according to the present invention;

FIG. 11 shows a flowchart for the process of the object analyzer according to the present invention;

FIG. 12 shows a flowchart for the process of the object analyzer according to the present invention;

FIG. 13 shows an embodiment of pseudo-code for an essential portion of the process of the object analyzer shown in FIGS. 11 and 12;

FIG. 14 schematically shows another embodiment of object code analysis according to the present invention;

FIG. 15 shows a flowchart for the process of performing an access authority determination according to the present invention;

FIG. 16 shows an embodiment of pseudo-code for performing the access authority determination shown in FIG. 15;

FIG. 17 shows an embodiment of a transaction in the Web service providing system according to the present invention;

FIG. 18 shows an embodiment of a transaction in the Web service providing system according to the present invention;

FIG. 19 shows an embodiment of a transaction in the Web service providing system according to the present invention;

FIG. 20 shows another embodiment of the server unit according to the present invention;

FIG. 21 shows the process of a Web service providing system which includes a prior access control mechanism;

FIG. 22 shows the process of a Web service providing system which includes a prior access control mechanism; and FIG. 23 shows the process of a Web service providing system which includes a prior access control mechanism and a cache mechanism.

DETAILED DESCRIPTION OF THE INVENTION

Now, the present invention will be described below with reference to specific embodiments shown in the drawings but the present invention should not be limited to those embodiments described later.

A: Overview of Web Service Providing System Configuration

FIG. 1 schematically shows the configuration of a Web service providing system according to the present invention. A Web service providing system 10 is configured to comprise a user terminal 12, a server unit 14, and a network 16 for remotely connecting between the user terminal 12 and the server unit 14. The user terminal 12 according to the present invention may be a computer such as a desktop computer, a notebook computer, and a portable computer, or a cellular telephone. The server unit 14 according to the present invention may be a computer system such as a personal computer and a workstation. The network 16 connecting the user terminal 12 and the server unit 14 may be a network employing TCP/IP or any other known communication protocol or may be a communication line such as ISDN and ADSL, a wireless network, a ground wave communication network, a satellite communication network, or any combination thereof which can give access to the server unit 14.

In the Web service providing system shown in FIG. 1, in order to receive high-value-added services from the server unit 14, a user makes a contract with a service provider to acquire authentication information such as a user ID and a password. To access the Web service providing system, the user accesses the network 16 such as Internet, specifies a URL address, and then enters the user's user ID (user identifier) and password. The server unit 14 is configured to allow the user to receive Web services at the particular URL site after access authorization.

High-value-added services used herein can include various services, for example, a weather forecast service which can provide detailed information successively according to the class of the user (hereinafter referred to as access authority: role), a financial service which provides differing interest rates or benefits according to the class of the user, a stock information service, a medical service, and an entertainment providing service.

For the purpose of detailed explanation of the present invention, it is assumed that the Web service providing system has a standard three-tier configuration using Servlet/EJB/DB and that the EJB section consists of Session Beans each of which is composed for an individual user and an Entity Bean common to the sessions. As a particular embodiment, stock or weather information is provided by means of Session Beans and getStockRecommendation( ) or getWeatherForecast( ) and such information is constructed by calling the stock (weather) Entity Bean connected to a database, getstockInfo( ), and getDetailedInfo( ).

In the present invention, the Session Beans do not require access control because each of them is composed for an individual user but each method for the Entity Bean is subject to access control on a basis of access authority. Thus, a user authentication process will be performed by means of the Session Beans to proceed properly.

It is also assumed in the following description of the embodiments that the method getDetailedInfo( ) is accessible to users of Gold access authority only and the method getDetailedStock( ) is accessible to users of Silver and Gold access authority. The method getWeatherForecast( ) is assumed to return different types of information depending on a user's access authority, that is, rough weather forecasts to a Bronze/Silver user and accurate weather forecasts to a Gold user. In addition, the method getStockRecommendation( ) is assumed to operate differently depending on a user's access authority, that is, it will return simple stock information to a user of Bronze access authority but it will call the method getDetailedStock( ) to return advanced recommendable stock information to a user of Silver or Gold access authority.

Then, a user authorized to access the server unit 14 sends to the server unit 14 an object call request to perform a user-requested Web service. The server unit 14 identifies a request object from the object call request to provide the service. Information required for the Web service is stored in the database 18 and presented to the user after an appropriate search or process is performed by the request object. The server unit 14 according to the present invention performs access control for the request object based on the access authority granted to the user and comprises a cache mechanism for storing execution results for an object previously accessed by the user. If the user requests the same service with the same access authority as that of any previous access or with a higher class of access authority than that of any previous access in other embodiments of the present invention, the user can have access to any execution result stored as a cache entry in the cache mechanism. In the present invention, the process after the cache mechanism is accessed until an execution result value is returned to the user is faster than an actual execution of an application.

Therefore, desired data can be provided at higher speeds by acquiring an execution result stored in the cache mechanism, as compared with initially requesting the same Web service. When an object is requested by the user for the first time, there is no corresponding cache entry and thus an object to provide the Web service is called in the server unit 14 so that appropriate methods are performed according to the access authority. The server unit 14 returns an execution result to the user to provide the Web service to the user and at the same time, stores the execution result in the cache mechanism as a new entry.

FIG. 2 schematically shows the functional blocks of the server unit 14 according to the present invention. As shown in FIG. 2, the server unit 14 according to the present invention is configured to comprise a transceiver 20 which performs transmission and reception operations through the network 16, a cache mechanism 22, an object analyzer 24 which analyzes an object for providing a Web service to generate an access authority set for a method which may be called by the object, based on the access authority for each method, and an object executor 26 which calls and executes the object for the Web service. The cache mechanism 22 allows a cache entry stored in the cache mechanism 22 to be searched, based on a received object call request, certain access authority granted to the user, and an access authority set.

In the particular embodiment according to the present invention, the object analyzer 24 analyzes object code such as EJB used by the object executor 26 to acquire a method which may be called on the code. This analysis is accomplished by analyzing the syntax in EJB and storing the method to be called, for example, in a hash table. Then, a method-access authority table which lists access authority assigned to each method is looked up to acquire access authority corresponding to the acquired method so that all access authority for execution of the object can be acquired. After all the access authority is acquired, the object analyzer 24 generates an object-access authority list and a generated application-access authority list is registered, for example, in appropriate memory 38.

The object executor 26 calls an object stored in storage means 28 such as a hard disk into appropriate memory for execution, generates an execution result for the object requested by the user, and then passes the generated execution result to the memory 38. The cache mechanism 22 reads the execution result from the memory 38 to provide the user with the execution result for the request object and at the same time, stores it as a new cache entry so that high-speed Web services can be provided in response to future user requests.

The cache mechanism 22 shown in FIG. 2 is configured to further comprise a request manager 30, an access controller 32, and a storage section 34. Within the cache mechanism 22 shown in FIG. 2, the request manager 30 and the access controller 32 are arranged in the server unit 14 to form control means for the storage section 34. In FIG. 2, the storage section 34 is shown to be arranged outside the server unit 14 but it can use the hard disk included in the server unit 14. The request manager 30 uses the user ID sent from the user as a key to look up a user-access authority table for acquiring certain access authority granted to the user. An object for executing a service desired by the user is identified from data in the object call request transmitted by the user and in order to uniquely specify the identified object, the object call request is expressed, for example, in text code so that the text code can be used as an identifier. In the following description, an object name is assumed to be used as an object identifier according to the present invention but any other identification techniques may be used herein. The object name is then passed to the access controller 32. The access controller 32 reads the object-access authority list stored in the memory 38 for comparison with the access authority held by the user to determine whether the access authority held by the user corresponds to the request object requested by the user.

If the request object requested by the user is accessible to the user of that access authority, the access controller 32 makes a search for the cache entry 36 corresponding to the object name requested by the user. When the corresponding cache entry 36*a* is found, the value of the cache entry 36*a* is passed to the access controller 32 to be provided to the user as the execution result and then succeeding requests from the user will be served. If the user erroneously or intentionally makes a request for an object exceeding the user's access authority, the access controller 32 compares the user's access authority with the object-access authority list, determines that the user has no appropriate access authority for that object, and then notifies the request manager 30 that this access should not be permitted. This notification can be accomplished by using any previously known techniques such as transmitting an access disabled flag.

In other embodiments according to the present invention, browser software may provide a display to the user to show that the user has no access authority to access the Web service. If the user holds appropriate access authority but no corresponding cache entry is found in the storage section 34, the request manager 30 will receive a notification of no corresponding cache entry. Upon receipt of this notification, the request manager 30 passes to the object executor 26 the object call request made by the user that has been temporarily stored in appropriate memory, for example, the memory 38. The object executor 26 calls the object for execution to generate an execution result requested by the user. The generated execution result is stored in the memory 38. The request manager 30 is configured to read the stored execution result and provide it to the user through browser software such as Netscape Navigator™ or Internet Explorer™.

FIG. 3 schematically shows the configuration of the object analyzer 24 according to the present invention. In the present invention, the object analyzer 24 is configured to comprise an input buffer 40, a parser 42, a method-access authority table 44, and an access authority set generator 46. The object analyzer 24 causes the input buffer 40 to acquire from the storage means 28 in advance an object which will be used by the object executor 26 and then passes the object stored in the input buffer 40 to the parser 42 for analyzing the object code. If methods which may be called by the object are acquired as a result of the analysis, the methods are stored in appropriate memory.

The object analyzer 24 reads the methods from the memory, looks up the method-access authority table 44 to acquire the access authority specified by the Web service provider for the methods, and then passes it to the access authority set generator 46. The access authority set generator 46 uses the passed access authority for each method to generate an access authority set corresponding to a predetermined object. The generated access authority set is temporarily stored in an output buffer 48. The object analyzer 24 brings the access authority sets accumulated in the output buffer 48 into correspondence with object names and stores them in the memory 38 to generate an object-access authority list.

In the present invention, the above-described object analyzer 24 is provided to acquire the methods which may be called during an object call and the corresponding access authority in advance to register them in appropriate memory, for example, the memory 38 as an object-access authority list. Therefore, there is no need to reconstruct the object-access authority list until a new object is added to provide another Web service, so that a high-speed access determination can be made. In addition, even if such a new object corresponding to another Web service is added, that object can be analyzed before the user actually requests it and thus, high-speed and high-reliability Web services can be provided at minimum costs even when any object program must be added.

B: Process Performed by Cache Mechanism of the Invention

FIG. 4 shows a flowchart for the process of a cache mechanism in the present invention. The process of a cache mechanism in the present invention begins at step S10 wherein an object call request is received from a user to identify the request object name. Then, the acquired request object name is stored in appropriate memory at step S12. At step S14, a user ID which has been sent in advance or supplied with the object call request is used as a key to look up a user-access authority table to acquire the access authority granted to the user, which is registered in the memory. At step S16, the acquired user's access authority and object name are used to read an entry of the object-access authority list from the memory for comparison.

If the result of the comparison made at step S16 shows that the requested object can be executed under the user's access authority (yes), the process proceeds to step S18. At step S18, the object name is used as a search key to search for a cache entry stored in the storage section 34. If the cache entry is found at step S18 (yes), the access controller is notified at step S20 that the cache entry is found. At step S22, an access controller which receives a searched execution result notifies a request processor of it to cause the request processor to acquire the value of the cache entry and then browser software is used to present the value to the user, so that a Web service can be provided.

If it is determined from the object-access authority list at step S16 that the storage section 34 is inaccessible under the user's access authority (no), the access controller is notified at step S24 that the access has been rejected. In the embodiment of the present invention, the user is also notified by the request processor that the access has been rejected at step 26. At the same time, the requested object call request is discarded from the cache mechanism.

FIG. 5 shows in detail the process to be performed when no cache entry is found (or "no") at step S18 in FIG. 4. If no cache entry is found at step S18 (no), the access controller is notified of it at step S28 and an object call request stored in appropriate buffer memory is passed to the object executor at step S30. Upon receipt of the object call request, the object executor calls the request object for execution and stores an execution result in appropriate memory, for example, the memory 38. The request processor reads the execution result from the memory 38 at step S32 and browser software is used to provide the execution result to the user at step S34. In addition, the execution result is read from a memory area with the appropriate object name and access authority set at step S36 and the object name, the access authority set, and the execution result are together registered in the storage section as a new cache entry at step S38.

C: Data Configuration Used by Cache Mechanism

FIG. 6 shows the data configuration for a user-access authority table used by the access controller 32 according to the present invention. As shown in FIG. 6, the user-access authority table contains user IDs for identifying users and access authority corresponding thereto (Gold, Silver, and Bronze) as a pair. This table is entered by a Web service provider or a server unit administrator and can be stored in, for example, the hard disk 28 or a user database. The user-access authority table shown in FIG. 6 can be stored in, for example, a user database (not shown) managed by the server unit 14. When the server unit 14 receives the user ID from a user, the user ID is stored in appropriate memory, the stored user ID is read by the access controller 32, and the read user ID is used as a key to look up the user-access authority table so that the user's access authority can be acquired by the access controller 32.

FIG. 7 shows an embodiment of the object-access authority list used by the access controller 32. In FIG. 7, the access authority is shown to have one of three classes, that is, Gold, Silver, or Bronze and the accessibility of object 1 and object 2 under each class of access authority is indicated by yes or no. More specifically, an object may be getWeatherForecast( ) for the above-described weather forecast or may be getStock-Recommendation( ) for stock information. To generate the yes accessibility of the object 1 under Bronze access authority, all the methods 1, 2, and z which may be called must be accessible to a user of Bronze access authority.

The access controller 32 acquires a user's access authority of Gold, Silver, or Bronze based on the user ID sent by the user as shown in FIG. 6, and then uses an object identifier as a key to look up the object-access authority list shown in FIG. 7. Then, it looks up the object and requested methods for comparison. If the accessibility of any one method to be called is no, cache access to the storage section 34 is disabled by setting no access enabled flag. The term "cache access enabled" means that reference to the storage section 34 can be made as well as that new data can be written in the storage section 34. An access authority set has as specific elements, columns for an application as shown in FIG. 3.

FIG. 8 shows an embodiment of the method-access authority table which can be used by the object analyzer 24 according to the present invention. In the method-access authority table, methods which may be called by an object and some classes of access authority under which these methods can be executed, for example, Gold, Silver, and Bronze are registered. This table is created by a service provider or a server unit administrator and stored in, for example, a database 28 or a user database.

FIG. 9 shows a specific configuration of a cache entry stored in the storage section 34. As shown in FIG. 9, a cache entry 36 in the storage section 34 is configured to contain an object name to execute a previously accessed Web service, an access authority set, and a corresponding object execution result. When an object call request is received and the user request is determined as cache access enabled, the access controller 32 looks up the storage section 34 with the corresponding object name as a key before executing the object to search for an appropriate cache entry. If the appropriate cache entry 36*a* is found, a searched execution result is provided to the user through browser software. If the appropriate cache entry is not found, a notification is sent to the access controller 32 and then, the value of an execution result obtained for the request object is stored together with the object name of the executed object and the access authority set as a cache entry 36*b*.

D: Detailed Process of Object Analyzer

The object analyzer 24 according to the present invention determines access authority for each method which may be called by an object to execute a Web service and then generates an object-access authority list. FIG. 10 schematically shows the process of the object analyzer 24 according to the present invention. FIG. 10(*a*) shows access authority for a called method m1 and for methods n1( ) to ni( ) which may be further called by the method m1. The access authority for these methods is given by the method-access authority table as shown in FIG. 8. The access authority for the predetermined method m1 is assumed to consist of access authority permission(m) given by a Web service provider for the method m1, for example, Gold, Silver, Bronze, A, X, Y, and Z, and access authority given for the methods n1( ) to ni( ) which may be called by the method, for example, {{B,S},{S,G}} for the method n1( ).

The expression {{B,S},{S,G}} means that access to the method n1( ) requires both access authority B or S and access authority S or G. In FIG. 10(*a*), the access authority {G,A} is established for the method m1 and access to the method m1 cannot be granted until all access authority requirements for the methods n1 to ni which may be called by the method m1 are satisfied. After this operation, a resultantly generated access authority set required to access the method m1 can be expressed as requires(m1)={{B,S}, {G}, {X}, {Y,Z}}. The above-described expression "requires" functions to give an access authority set listed in the application-access authority list. FIG. 10(*b*) shows a logical expression to obtain the access authority set requires(m) in the particular embodiment according to the present invention. The present invention can be adapted to reject access to the cache mechanism when access authority for a called method is unknown. To the contrary, the present invention may be adapted to be capable of only providing a Web service even while access to the cache mechanism is not permitted when access authority for a called method is unknown. The expression "unknown" in FIG. 10(*b*) means that unknown access authority is given for a method and in the present invention, cache access can be rejected due to any method with unknown access authority or cache access may be also rejected due to such method with unknown access authority but at least a Web service can be executed. This flexibility in settings can be achieved by functionally and completely separating the object analyzer 24 from the cache mechanism 22 in the present invention.

FIG. 11 shows a flowchart for the process performed by the object analyzer 26 to handle access authority for each method in the present invention. The process of the object analyzer begins at step S50 wherein a method list (todo-list) for listing methods which may be called by a program and an executed-method list (done-list) for storing executed methods are cleared. At step S52, a method obtained by analyzing an object is stored in the method list. At step S54, reference is made to a method-access authority table to acquire access authority for the method stored in the method list. At step S56, it is determined whether the method list is empty, and if the method list is empty (yes), all the methods which may be called have been executed and the process proceeds to step S58 to generate a final access authority set. If the method list is not empty (no), some methods to be executed still remain in the list and the process returns to step S54 to repeat the steps.

FIG. 12 shows a detailed flowchart for the process at step S54 shown in FIG. 11. The process begins at step S60 wherein a method is extracted from the method list. At step S62, the method-access authority table is looked up to acquire access authority for the extracted method and store it in memory. At step S64, the extracted method is moved to the executed-method list and at the same time, it is removed from the method list. At step S66, other methods which may be called through a method call are added to the method list and then the process is repeated as usual until a positive result is obtained from the determination at step S54. FIG. 13 shows pseudo-code used in the particular embodiment for performing the process described in FIG. 12 and according to the present invention, any pseudo-code which can achieve similar functions may be used to perform the process shown in FIG. 12. In the process as described above, code analysis is performed according to the present invention, so that all methods which must (or may) be accessed to execute services can be listed in the executed-method list including set variables.

In another embodiment according to the present invention, a method can be contained in the method list by employing a method of searching method code for a portion which involves a method call such as invokevirtual rather than by directly performing a flow analysis. The process for such another embodiment of the present invention as described above is shown in FIG. 14. Specifically, the process can be performed, assuming that a method which is called for a static class or interface of an object specified in a method call is also called for its subclass. For example, it is assumed that getInfo( ) is called for a Weather-type object as described above for a weather forecast information providing service and that the class Weather has a subclass WeatherImpl. Then, in addition to getInfo( ) of the Weather class, getInfo( ) of the WeatherImpl subclass can be contained in the method list, assuming that the latter may be also called. Moreover, according to the present invention, a control flow analysis or a data flow analysis can be performed to add a process for removing methods which may not be called from those which may be obtained without performing such a flow analysis.

E: Detailed Process for Access Authority Determination in Access Controller

FIG. 15 shows a detailed flowchart for the process in the access controller according to the present invention. The process for access authority determination begins at step S70 wherein the access enabled flag is set to an initial state (false). At step S72, the first set of the access authority sets in the object-access authority list for a requested object is read from memory. At step S74, the user's access authority is compared with the read set and the comparison result is stored in the memory. At step S76, the comparison result is read from the memory to determine whether the value is false. If the comparison result is false (yes), the user does not hold at least one set of access authority and the process finishes at step S78. Then, the access enabled flag is kept null. If the comparison result is not false (no), it is determined at step S80 whether all sets have been determined, and if all sets have not been determined (no), the process returns to step S74 to read the next set from the memory and to make a determination of step S76.

If it is determined at step S80 that all access authority sets have been determined (yes), the user holds access authority for all access authority sets and the process proceeds to step S82 to set the access enabled flag so that access to the storage section 34 can be permitted with a specified user ID and a specified object. FIG. 16 shows pseudo-code for performing a determination process through steps S74 to S80 in the flowchart shown in FIG. 15, assuming that the user holds access authority p and the access authority sets are (A,B), (B,C), and (X,Y,Z) and according to the present invention, any coding which can implement similar functions may be used as described above for FIG. 13.

FIG. 17 shows a request-response sequence between the user terminal 12 and the server unit 14 in the Web service providing system according to the present invention. In FIG. 17, the user terminal 12 issues an object call request and the request manager 30 receives the object call request and requests the access controller 32 to make an access authority determination. The access controller 32 looks up a user-access authority list to determine the user's access authority, and if it is determined that the user holds necessary access authority, the access controller 32 issues to the storage section 34 a search request to search for a cache entry. In the embodiment shown in FIG. 17, no appropriate cache entry is found and a null response is returned to the access controller 32.

The access controller 32 receives a notification of no cache entry and passes to the request manager 30 a notification that an object call is permitted. Upon receipt of this notification, the request manager 30 passes an object call request to the object executor 26 for execution. The request manager 30 acquires an execution result and then provides it to the user. The access controller 32 issues a storage request to cause the storage section 34 to store the new execution result therein.

FIG. 18 shows another embodiment of the request-response sequence in the Web service providing system according to the present invention. In FIG. 18, the user terminal 12 issues an object call request and the request manager 30 receives the object call request and requests the access controller 32 to make an access authority determination. The access controller 32 looks up a user-access authority list to determine access authority, and if it is determined that the user holds necessary access authority, the access controller 32 issues to the storage section 34 a request to search for a cache entry.

In the embodiment shown in FIG. 18, an appropriate cache entry is found and the value of the cache entry is acquired by the request manager 30 and then provided to the user as a result of the service response. As shown in FIG. 18, according to the present invention, since an access authority determination is made before the value of the cache entry is returned to the user, the security of the cache entry can be improved and Web services can be provided to the user at higher speeds.

FIG. 19 shows still another embodiment of the request-response sequence between the user terminal 12 and the server unit 14 in the Web service providing system according to the present invention. The embodiment shown in FIG. 19 indicates, for example, a case where the user has previously received a Web service under some class of access authority and thereafter any change is made to the access authority class or to the Web services accessible under a predetermined class of access authority for the Web service provider's reasons.

In FIG. 19, the user terminal 12 issues an object call request. The request manager 30 receives the object call request and requests the access controller 32 to make an access authority determination. The access controller 32 looks up a user-access authority list to determine access authority. In the embodiment shown in FIG. 19, an appropriate cache entry is found and the value of the cache entry is returned to the access controller 32. In the embodiment shown in FIG. 19, the access controller 32 determines that the user has no authority to access the cache entry at that point in time and issues a notification that access is rejected because of no access authority for the cache entry, and then the request manager 30 receives this notification.

Upon receipt of this notification, the request manager 30 in turn notifies the user of access rejection. The user who receives this notification sends another object call request and the server unit 14 selectively repeats the processes shown in FIGS. 17 to 19 to proceed with transactions with the user. As shown in the embodiment of FIG. 19, the present invention can provide high-speed and high-reliability Web services through minimum software and hardware resources even when any change is made to the user's access authority or the Web service conditions.

In the embodiments of the present invention, as described above, an access authority set may be configured as a set which has some sets as its elements with each of the sets simply having one or more classes of access authority as its element(s). Alternatively, if there are two sets R and S each having one or more classes of access authority as its element(s) and it is known that holding any class of access authority in the set R represents holding any class of access authority in the set S, a user may be allowed to hold the access authority set R only. For example, when the set R is {Gold} and the set S is {Gold,Silver}, an access authority set for a user may be configured to exclude the set S if the user holds the set R.

In other embodiments of the present invention, an administrator of the server unit may specify that a result from a service is cached, regardless of code analysis results for a Web service object.

For example, it is assumed that a code analysis disables the access control mechanism to return any cache result for a method getWeatherForecast( ). Under normal conditions, an actual Web service object is always called in response to a request for getWeatherForecast( ). However, if an administrator specifies that an application server unit may "cache a result from getWeatherForecast( )" for a specifically limited user, a cached result may be returned in response to subsequent requests for getWeatherForecast( ). If the cache mechanism is configured to do so and a cache entry corresponding to a request is found, the present invention can allow the cache mechanism to return the value of the cache entry as an execution result to the user without determination of the access controller, since the object analyzer and the access controller are independent of each other.

FIG. 20 shows still another embodiment according to the present invention. In the embodiment of the present invention as shown in FIG. 20, the storage section 34 may be attached to an edge server unit 50. More specifically, in an embodiment of the present invention, the cache mechanism according to the present invention is placed on the edge server unit 50 which is independent of an application server unit 52. The edge server unit 50 can provide the user with a unified interface to a plurality of application server units because it is placed between the user and the application server unit 52. The edge server unit 50 can be configured to accept a request from the user, to request the application server unit 52 to perform a process contained in the request, and to return to the user a result which is passed to the edge server unit 50.

The cache mechanism 22 in the edge server unit may be configured to cache a result received from the application server unit 52 and to return the cached result in response to a user request. The access-controlled cache mechanism in the above-described edge server unit may not greatly differ in process embodiment from the cache mechanism contained in the server unit 12 and communications between the cache feature 22 and the program executor 24 can be established via a network, for example, the Internet through the TCP/IP protocol, LAN, or WAN.

Means or part used to implement each of the above-described functions according to the present invention may be configured as software or software modules written in a computer-executable programming language and must not necessarily be configured as a functional block as shown in the drawings. In the Web service providing system of the present invention, a required table may be created together with any functional module when necessary and it should not be limited to the specific embodiments of the present invention as shown in the drawings.

The program according to the present invention may be written in various programming languages, for example, Java□ Beans, and codes of the program according to the present invention may be held on a computer-readable recording medium such as a magnetic tape, a flexible disk, a hard disk, a compact disk (CD), a magneto-optic disk, and a digital versatile disk (DVD).

As described above, the present invention can provide a Web service providing system which can provide high-value-added Web services as quickly as possible with a high degree of reliability. The present invention can also provide a server unit which can provide the above-described Web services. The present invention can further provide a server unit control method which can cause a computer system to function as the above-described server unit. It is still another object of the present invention to provide a program to cause a computer system to function as the above-described server unit and a computer-readable recording medium on which the program is recorded.

The invention claimed is:

1. A method, comprising:

receiving a call request from a user to execute an object;

determining an access authority for the user;

acquiring an object access authority set for the object indicating access authorities for methods called by the object;

comparing the user access authority and the object access authority set to determine whether the user access authority permits access to the methods called by the object;

searching a storage section storing execution results for a previous execution of the object prior to executing the call request and in response to determining that the user access authority permits access to the methods called by the object;

transmitting the execution results for the previous execution of the object prior to executing the call request with respect to the object in response to determining that the storage section stores the execution results for the previous execution of the object subject to the call request; and passing the call request to an object executor in response to determining that the storage section does not store execution results for the previous execution of the object subject to the call request.

2. The method of claim 1, wherein the call request is received over a network, and wherein the execution results are transmitted over the network and wherein the call request with respect to the object comprises a request for Web services.

3. The method of claim 1, further comprising:

determining methods called by the object;

determining an access authority for each determined method;

generating the object access authority set to comprise the determined access authorities of the determined methods, wherein the object access authority set indicates access authorities needed to execute the determined methods.

4. The method of claim 3, wherein determining the access authority for each determined method calling additional methods comprises:

determining the access authorities of the additional methods called by the method, wherein the object access authority set for the method additionally includes the determined access authorities of the additional methods called by the method.

5. The method of claim 3, wherein access to the execution results is not granted to the user if the access authority for one determined method is unknown.

6. The method of claim 5, wherein the object is executed even if access to the execution results is not granted.

7. The method of claim 1, further comprising:

storing execution results from the object executor in response to executing the object of the call request with the access authority set for the object and an object name.

8. The method of claim 1, further comprising:

returning the execution results to the user having user access authority permitting access to the object.

9. The method of claim 1, further comprising:

receiving a subsequent call request for the object from the user;

returning the execution results to the user in response to determining that the execution results are associated with the user without comparing the user access control to the object access authority.

10. A system for providing services, comprising:

a computer;

a storage section storing execution results for a previous execution of objects; code executed by the computer to perform operations, the operations comprising:

receiving a call request from a user to execute an object;

determining an access authority for the user;

acquiring an object access authority set for the object indicating access authorities for methods called by the object;

comparing the user access authority and the object access authority set to determine whether the user access authority permits access to the methods called by the object;

searching a storage section storing execution results for a previous execution of the object prior to executing the call request and in response to determining that the user access authority permits access to the methods called by the object;

transmitting the execution results for the previous execution of the object prior to executing the call request with respect to the object in response to determining that the storage section stores the execution results for the previous execution of the object subject to the call request; and passing the call request to an object executor in response to determining that the storage section does not store execution results for the previous execution of the object subject to the call request.

11. The system of claim 10, wherein the operations further comprise:

determining methods called by the object;

determining an access authority for each determined method;

generating the object access authority set to comprise the determined access authorities of the determined methods, wherein the object access authority set indicates access authorities needed to execute the determined methods.

12. The system of claim 11, wherein determining the access authority for each determined method calling additional methods comprises:

determining the access authorities of the additional methods called by the method, wherein the object access authority set for the method additionally includes the determined access authorities of the additional methods called by the method.

13. The system of claim 11, wherein access to the execution results is not granted to the user if the access authority for one determined method is unknown.

14. The system of claim 13, wherein the object is executed even if access to the execution results is not granted.

15. The system of claim 10, wherein the operations further comprise:

storing execution results from the object executor in response to executing the object of the call request with the access authority set for the object and an object name.

16. The system of claim 10, wherein the operations further comprise:

receiving a subsequent call request for the object from the user; and returning the execution results to the user in response to determining that the execution results are associated with the user without comparing the user access control to the object access authority.

17. A computer readable recording medium including instructions that when executed cause a computer to interact with a storage section and to perform operations comprising:

receiving a call request from a user to execute an object;

determining an access authority for the user;

acquiring an object access authority set for the object indicating access authorities for methods called by the object;

comparing the user access authority and the object access authority set to determine whether the user access authority permits access to the methods called by the object;

searching a storage section storing execution results for a previous execution of the object prior to executing the call request and in response to determining that the user access authority permits access to the methods called by the object;

transmitting the execution results for the previous execution of the object prior to executing the call request with respect to the object in response to determining that the storage section stores the execution results for the previous execution of the object subject to the call request; and passing the call request to an object executor in response to determining that the storage section does not store execution results for the previous execution of the object subject to the call request.

18. The computer readable recording medium of claim 17, further comprising:

determining methods called by the object;

determining an access authority for each determined method;

generating the object access authority set to comprise the determined access authorities of the determined methods, wherein the object access authority set indicates access authorities needed to execute the determined methods.

19. The computer readable recording medium of claim 18, wherein determining the access authority for each determined method calling additional methods comprises:

determining the access authorities of the additional methods called by the method, wherein the object access authority set for the method additionally includes the determined access authorities of the additional methods called by the method.

20. The computer readable recording medium of claim 18, wherein access to the execution results is not granted to the user if the access authority for one determined method is unknown.

21. The computer readable recording medium of claim 20, wherein the object is executed even if access to the execution results is not granted.

22. The computer readable recording medium of claim 17, further comprising:

storing execution results from the object executor in response to executing the object of the call request with the access authority set for the object and an object name.

23. The computer readable recording medium of claim 17, further comprising:

receiving a subsequent call request for the object from the user;

returning the execution results to the user in response to determining that the execution results are associated with the user without comparing the user access control to the object access authority.

* * * * *